US012809731B2

(12) United States Patent
Ramasamy et al.

(10) Patent No.: US 12,809,731 B2
(45) Date of Patent: Nov. 24, 2026

(54) METHOD AND APPARATUS FOR CONTROL OF WEIGHT-BASED HIGH AVAILABILITY OF SERVICE IN CONTAINER-BASED MULTI-CLUSTER ENVIRONMENT

(71) Applicant: SAMSUNG ELECTRONICS CO., LTD., Suwon-si (KR)

(72) Inventors: Boopathi Ramasamy, Suwon-si (KR); Weonsu Kim, Suwon-si (KR); Jun Kim, Suwon-si (KR); Yeonjoo Na, Suwon-si (KR); Kyoungbeom Chea, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/196,153

(22) Filed: May 1, 2025

(65) Prior Publication Data

US 2025/0258744 A1 Aug. 14, 2025

Related U.S. Application Data

(63) Continuation of application No. PCT/KR2023/016759, filed on Oct. 26, 2023.

(30) Foreign Application Priority Data

Nov. 1, 2022 (KR) ........................ 10-2022-0143979

(51) Int. Cl.
*G06F 11/00* (2006.01)
*G06F 9/455* (2018.01)
(Continued)

(52) U.S. Cl.
CPC ...... *G06F 11/2082* (2013.01); *G06F 9/45558* (2013.01); *G06F 11/1658* (2013.01);
(Continued)

(58) Field of Classification Search
None
See application file for complete search history.

(56) References Cited

U.S. PATENT DOCUMENTS

2006/0020686 A1 1/2006 Liss et al.
2008/0201462 A1 8/2008 Liss et al.
(Continued)

FOREIGN PATENT DOCUMENTS

CN 112000477 A 11/2020
KR 20150029181 A 3/2015
(Continued)

OTHER PUBLICATIONS

Kadam et al., "Anomaly identification and failure diagnosis," 2017 IEEE International Conference on Electrical, Instrumentation and Communication Engineering (ICEICE), Karur, India, 2017, pp. 1-4 (Year: 2017).*

(Continued)

*Primary Examiner* — Bryce P Bonzo
*Assistant Examiner* — Gabriella Kanani Shelton
(74) *Attorney, Agent, or Firm* — Nixon & Vanderhye, P.C.

(57) ABSTRACT

The present disclosure relates to a container-based cluster environment and, to a method and apparatus for controlling a container application in a container-based multi-cluster environment. The method performed by a first element management system (EMS) in a first cluster comprises: if the first EMS is in an active state, identifying pods that are running and in service; identifying a weight for each of the pods that are running and in service; based on the weight for each of the pods that are running and in service, identifying that a state of the first EMS is an abnormal state requiring state transition; if the state of the first EMS is the abnormal state, transmitting, to a second EMS in a second cluster, a
(Continued)

state change message instructing to change a state of the second EMS from a standby state to the active state; and changing the state of the first EMS to the standby state, wherein the active state includes a state in which one or more service pods included in an EMS are running and in service, and the standby state may include a state in which the one or more service pods are running but are not in service.

20 Claims, 12 Drawing Sheets

(51) Int. Cl.
*G06F 11/16* (2006.01)
*G06F 11/20* (2006.01)
*G06F 11/30* (2006.01)

(52) U.S. Cl.
CPC .. *G06F 11/301* (2013.01); *G06F 2009/45591* (2013.01); *G06F 2201/81* (2013.01)

(56) References Cited

U.S. PATENT DOCUMENTS

| | | | | |
|---|---|---|---|---|
| 2015/0074447 | A1 | 3/2015 | Park et al. | |
| 2016/0277316 | A1* | 9/2016 | Arigaya | G06F 11/07 |
| 2019/0050158 | A1* | 2/2019 | Nguyen | G06F 3/0673 |
| 2021/0084103 | A1 | 3/2021 | Smith | |
| 2021/0111942 | A1 | 4/2021 | Tahhan et al. | |
| 2021/0373968 | A1* | 12/2021 | Iwasa | G06F 9/45558 |
| 2022/0116285 | A1 | 4/2022 | Abdollahi Vayghan | |
| 2022/0188192 | A1 | 6/2022 | Wang et al. | |
| 2022/0295594 | A1 | 9/2022 | Spapis et al. | |
| 2022/0318071 | A1 | 10/2022 | Zhong et al. | |
| 2022/0398175 | A1* | 12/2022 | Ukawa | G06F 11/1484 |

FOREIGN PATENT DOCUMENTS

| | | | |
|---|---|---|---|
| KR | 102114339 | B1 | 5/2020 |
| KR | 20220071719 | A | 5/2022 |
| WO | 2014026025 | A1 | 2/2014 |

OTHER PUBLICATIONS

Wikipedia, "Exit status" (Year: 2026).*
International Search Report for PCT/KR2023/0166759, mailed Feb. 14, 2024, 6 pages.
Written Opinion of the ISA for PCT/KR2023/0166759, mailed Feb. 14, 2024, 4 pages.
Chandrasekaran et al., "CASE: A Context-Aware Storage placement and retrieval Ecosystem", IEEE Access, vol. XX, 2021, 12 pages.
Extended European Search Report dated Dec. 19, 2025 issued in European Patent Application No. 23886136.3.
Vayghan et al., "A Kubernetes controller for managing the availability of elastic microservice based stateful applications", Elsevier, The Journal of Systems & Software, Jul. 15, 2020, 13 pages.
Korean Office Action dated Sep. 29, 2026 for KR Application No. 10-2022-0143979.

* cited by examiner

METHOD AND APPARATUS FOR CONTROL OF WEIGHT-BASED HIGH AVAILABILITY OF SERVICE IN CONTAINER-BASED MULTI-CLUSTER ENVIRONMENT

CROSS-REFERENCE TO RELATED APPLICATIONS

This application is a continuation of International Application No. PCT/KR2023/016759 designating the United States, filed on Oct. 26, 2023, in the Korean Intellectual Property Receiving Office and claiming priority to Korean Patent Application No. 10-2022-0143979, filed on Nov. 1, 2022, in the Korean Intellectual Property Office, the disclosures of each of which are incorporated by reference herein in their entireties.

BACKGROUND

Field

The disclosure relates to a container-based cluster environment and, for example, to a method and an apparatus for controlling a redundancy operation of a container application, based on a service weight in a container-based multi-cluster environment.

Description of Related Art

A container may virtualize a basic operating system (OS) to allow a containerized app to perceive that the app includes its own OS, such as a central processing unit (CPU), a memory, a file storage, and a network connection. Therefore, containers may be distributed and executed anywhere.

Since containers share a host OS, there's no need to boot an OS or load a library. This makes containers significantly more efficient and lightweight. A container-based application may start within seconds, and compared to virtual machine (VM) scenarios, more instances of the application may correspond to a machine. A shared OS access scheme also offers the added benefit of reduced overhead in terms of maintenance, such as patches and updates.

SUMMARY

Embodiments of the disclosure provide a method and an apparatus for controlling a redundancy operation of a container application, based on a service weight in a container-based multi-cluster environment.

Embodiments of the disclosure provide a method and an apparatus for changing the state of a container application of a candidate cluster at the time of failure occurrence, based on a service weight in a container-based multi-cluster environment.

According to various example embodiments of the disclosure, a method performed by a first element management system (EMS) of a first cluster may include: based on the first EMS being in an active state, identifying pods that are running and providing service, identifying respective weights of the pods that are running and providing service, identifying that a state of the first EMS is an abnormal state requiring a state change, based on the respective weights of the pods that are running and providing service, based on the state of the first EMS being the abnormal state, transmitting, to a second EMS of a second cluster, a state change message indicating a change of a state of the second EMS from a standby state to the active state, and changing the state of the first EMS to the standby state, wherein the active state includes a state in which one or more service pods included in an EMS are running and providing service, and wherein the standby state includes a state in which the one or more service pods are running but not providing service.

According to various example embodiments of the disclosure, a method performed by a second element management system (EMS) of a second cluster may include: based on the second EMS being in a standby state and a first EMS of a first cluster being in an abnormal state requiring a state change, receiving a state change message from the first EMS, and changing a state of the second EMS from the standby state to an active state, wherein the active state includes a state in which one or more service pods included in an EMS are running and providing service, wherein the standby state includes a state in which the one or more service pods are running but not providing service, and wherein the abnormal state is identified based on a weight of a pod that is running and providing service.

According to various example embodiments of the disclosure, a first element management system (EMS) of a first cluster may include: a transceiver and at least one processor, comprising processing circuitry, connected to the transceiver, wherein at least one processor, individually and/or collectively, is configured to cause the first EMS to: based on the first EMS being in an active state, identify pods that are running and providing service, identify respective weights of the pods that are running and providing service, identify that a state of the first EMS is an abnormal state requiring a state change, based on the respective weights of the pods that are running and providing service, based on the state of the first EMS being the abnormal state, transmit, to a second EMS of a second cluster, a state change message indicating a change of a state of the second EMS from a standby state to the active state, and change the state of the first EMS to the standby state, wherein the active state includes a state in which one or more service pods included in an EMS are running and providing service, and wherein the standby state includes a state in which the one or more service pods are running but not providing service.

According to various example embodiments of the disclosure, a second element management system (EMS) of a second cluster may include: a transceiver and at least one processor, comprising processing circuitry, connected to the transceiver, wherein at least one processor, individually and/or collectively, is configured to cause the second EMS to: based on the second EMS being in a standby state and a first EMS of a first cluster being in an abnormal state requiring a state change, receive a state change message from the first EMS, and change a state of the second EMS from the standby state to an active state, wherein the active state includes a state in which one or more service pods included in an EMS are running and providing service, wherein the standby state includes a state in which the one or more service pods are running but not providing service, and wherein the abnormal state is identified based on a weight of a pod that is running and providing service.

In accordance with the above discussion, the disclosure provides a method and an apparatus for controlling a redundancy operation of a container application in a container-based multi-cluster environment, to enable efficient use of the container application.

In addition, the disclosure provides a method and an apparatus for changing the state of a container application of a candidate cluster at the time of failure occurrence in a container-based multi-cluster environment, to maintain the state between clusters in a state-dependent application.

Advantageous effects obtainable from the disclosure may not be limited to the above-mentioned effects, and other effects which are not mentioned may be clearly understood from the following descriptions by those skilled in the art to which the disclosure pertains.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
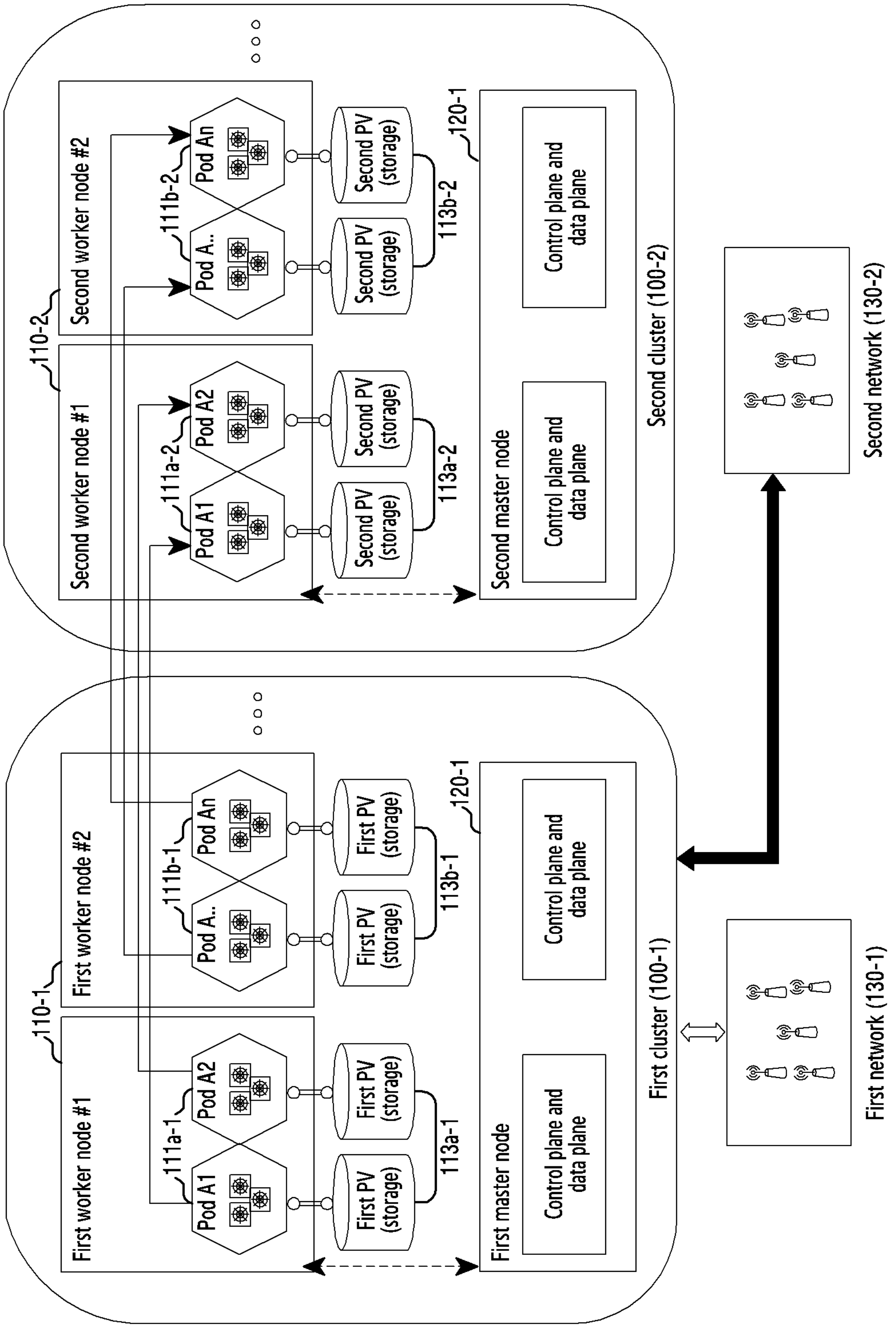
FIG. 1 is a diagram illustrating an environment for controlling a cluster application in a container-based cluster according to various embodiments.

Hereinafter, various example embodiments of the disclosure will be described in greater detail with reference to the accompanying drawings. In describing the disclosure, a detailed description of known functions or configurations may be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the disclosure.

In the detailed description, based on determinations by those skilled in the art, the disclosure may also be applied to other communication systems having similar technical backgrounds and channel types through some modifications without significantly departing from the scope of the disclosure.

The advantages and features of the present disclosure and ways to achieve them will be apparent by making reference to embodiments as described below in detail in conjunction with the accompanying drawings. However, the disclosure is not limited to the various example embodiments set forth below, but may be implemented in various different forms. The following example embodiments are provided only to completely disclose the disclosure and inform those skilled in the art of the scope of the disclosure. Throughout the disclosure, the same or like reference signs indicate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block in the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in various embodiments of the disclosure, the term “unit” refers to a software element or a hardware element, such as a field programmable gate array (FPGA) or an application specific integrated circuit (ASIC), and the “unit” may perform certain functions. However, the “unit” does not always have a meaning limited to software or hardware. The “unit” may be constructed either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" may be implemented to reproduce one or more CPUs within a device or a security multimedia card.

A container may virtualize a basic operating system (OS) to allow a containerized app to perceive that the app includes its own OS, such as a central processing unit (CPU), a memory, a file storage, and a network connection. Therefore, containers may be distributed and executed anywhere. A container may provide flexibility to execute a cloud application in a physical or virtual infra. A container may package services configuring an application and enable portability across various computer environments for development, testing, and production use. Using a container may rapidly expand application objects in response to sudden increases in demand. In addition, a container uses an operating system (OS) resource of a host and thus may be more lightweight than virtual machines (VMs). In a Kubernetes environment, a cluster may distribute an application or service to a network, and this may be regarded as a cluster for a single configuration.

According to an embodiment of the disclosure, the description of a cluster may be used to refer to the description of an EMS included in the cluster. In addition, the state of a cluster may be used in the same sense as the state of an EMS included in the cluster. For example, with reference to FIG. 1, the state of a first cluster 100-1 may be used in the same sense as the state of a first EMS included in the first cluster. For example, the state of a second cluster 100-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

If an application included in a container-based cluster is a state-dependent (stateful) application, when a container-based cluster is in an active state, a remaining container-based cluster may need to maintain a standby state. If an active-active state is maintained, the following problems may occur.

- Task complexity: In a case of an active-active state, network elements (NEs) need to be dispersed between clusters, and otherwise, an error may easily occur to an operator.
- Data collision: In a case of an active-active state, if two clusters are both running, updates of the two clusters may cause synchronization delays and service disruption or malfunction.
- Synchronization data needs to be configured bidirectionally, and data collisions may occur during data replication.

However, a container-based cluster does not support an active-standby state. For example, in a case where there are two container-based clusters, the active-standby state may imply that the EMS of one container-based cluster is in an active state, and the EMS of the other container-based cluster is in a standby state.

In a container-based application, when an abnormal situation occurs in a cluster, there has been an issue in which a backup server has remained connected to the outside. If an application included in a container-based cluster is a state-dependent (stateful) application, a one-to-one mapping relationship may occur between an active cluster and a standby cluster. Therefore, data needs to be synchronized from the active cluster to a backup site and from the backup site to the standby cluster. The data may include file data and data for application execution. A file may refer to data related to materials stored in the cluster, and the data for application execution may be data related to an application being executed by the EMS.

In a container-based application, an external storage is required for backup, and backup and data management need to be performed externally. The following problems may occur as a result:

Synchronization may take a significant amount of time.

Data larger than the storage capacity of the external storage may be transmitted.

Due to the large time required for synchronization, data may not be up to date.

The disclosure provides a method for synchronization between clusters to address these problems.

FIG. 1 is a diagram illustrating an example container-based cluster environment according to various embodiments.

Referring to FIG. 1, a network environment may include a first cluster 100-1 and a second cluster 100-2. Although FIG. 1 illustrates clusters including the first cluster 100-1 and the second cluster 100-2, this is merely for convenience of explanation and does not exclude an environment in which an additional cluster exists. In addition, the network environment may include a first network 130-1 and a second network 130-2. Although FIG. 1 illustrates networks including the first network 130-1 and the second network 130-2, this is merely for convenience of explanation and does not exclude an environment in which three or more networks exist.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 100-1 may be used in the same sense as the state of a first EMS included in the first cluster. For example, the state of the second cluster 100-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

The first cluster 100-1 may include one or more first worker nodes 110-1, one or more first persistent volumes (PVs) **113*a*-1 and 113*b*-1, and a first master node 120-1. Each of the one or more first worker nodes 110-1 may include one or more first pods 111*a*-1 or 111*b*-1, and the one or more first pods 111*a*-1 or 111*b*-1 may be connected to the one or more first PVs 113*a*-1 or 113*b*-1, respectively. The first cluster 100-1 may communicate with the first network 130-1. The first cluster 100-1 may communicate with the second network 130-2. The first network 130-1 and the second network 130-2** may be distinguished logically or geographically.

The second cluster 100-2 may be distinguished from the first cluster 100-1 logically or geographically. The second cluster 100-2 may include one or more second worker nodes 110-2, one or more second PVs **113*a*-2 and 113*b*-2, and a second master node 120-2. Each of the one or more second worker nodes 110-2 may include one or more second pods 111***a*-2 or 111*b*-2, and the one or more second pods 111*a*-2 or 111*b*-2 may be connected to the one or more second PVs 113*a*-2 or 113*b*-2, respectively. The second cluster 100-2 may communicate with the first network 130-1. The second cluster 100-2 may communicate with the second network 130-2.

Hereinafter, the descriptions of each of the first cluster 100-1 and the second cluster 100-2 may be applied as a description of a cluster. The descriptions of each of the one or more first worker nodes 110-1 and the one or more second worker nodes 110-2 may be applied as a description of a worker node. The descriptions of each of the one or more first pods 111*a*-1 and 111*b*-1 and the one or more second pods 111*a*-2 and 111*b*-2 may be applied as a description of a pod. The descriptions of each of the one or more first PVs 113*a*-1 and 113*b*-1 and the one or more second PVs 113*a*-2 and 113*b*-2 may be applied as a description of a PV. The descriptions of each of the first master node 120-1 and the second master node 120-2 may be applied as a description of a master node. The descriptions of each of the first network 130-1 and the second network 130-2 may be applied as a description of a network.

A cluster may refer to a set of nodes in a physical or virtual environment that hosts a container-based application. The cluster may be largely divided into a worker node and a master node. The worker node may be a node on which one or more containers are arranged, and the master node may be a node that manages the worker node. Through the master node of the cluster, an administrator may control the entire cluster.

A worker node may include multiple pods. A container-based cluster may place a container to be executed by the worker node on a pod and execute the container. The worker node may be a virtual machine (VM) or a physical machine (PM) according to the cluster. Each worker node may be managed by a master node. Specifically, each worker node may be managed by a control plane within the master node. According to an embodiment of the disclosure, each worker node may include a service required for executing a pod. According to an embodiment of the disclosure, the cluster may include multiple worker nodes.

A pod may be the smallest computing unit that a container-based cluster is capable of generating, managing, and distributing. According to an embodiment of the disclosure, the pod is a group of one or more containers that includes a shared storage, a network resource, and a specification on a container execution method. For example, the shared storage may be a PV.

A PV may be a storage of a cluster. For example, the PV may be a storage of the cluster that has been provisioned by an administrator or is provisioned using a storage class. Similar to a worker node being a resource of the cluster, the PV is also a resource of the cluster. The PV may have a lifecycle independent of an individual pod that uses the PV.

A master node may include a control plane and a data plane. According to an embodiment of the disclosure, the control plane may perform a role of, when a worker node is registered, assigning a classless inter-domain routing (CIDR) block to the node. According to an embodiment of the disclosure, the control plane may perform a role of keeping a list of worker nodes up to date along with a list of available systems of a cloud provider. For example, the control plane may query the cloud provider about whether a virtual machine (VM) of a worker node is continuously usable, when the worker node is abnormal during execution in a cloud environment. If the worker node is not able to be continuously used, the control plane may remove the corresponding worker node from the list of worker nodes. According to an embodiment of the disclosure, the control plane may monitor the state of a node.

A network may serve as a radio access network and perform a role of a radio access network. The network may be an entity that provides a wireless channel for accessing a 5G core network. The network may be connected to a cluster. The network may be a wired network.

According to an embodiment of the disclosure, the first cluster 100-1 may be a cluster in an active state. According to an embodiment of the disclosure, the second cluster 100-2 may be a cluster in a standby state. A cluster in an active state may refer to a state in which service pods included in the cluster are running and providing service. A cluster in a standby state may refer to a state in which service pods included in the cluster are running but not providing service. A synchronization pod, which is distinguished from a service pod, may indicate a state where the pod that is running and providing service regardless of an active state or a standby state. The synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization.

Data may be synchronized in real time from the one or more first PVs 113*a*-1 and 113*b*-1 to the one or more second PVs 113*a*-2 and 113*b*-2, respectively. The data may include file data and data for application execution. A file may refer to data stored in the cluster, and the data for application execution may be data related to an application being executed by the EMS.

According to an embodiment of the disclosure, real-time synchronization may be performed by the one or more first pods 111*a*-1 and 111*b*-1 included in the first cluster 100-1 and the one or more second pods 111*a*-2 and 111*b*-2 included in the second cluster 100-2. Through such real-time synchronization, even if the state of the first cluster 100-1 changes from an active state to a standby state or an abnormal state due to an abnormal situation, the second cluster 100-2 may immediately execute an application that has been executed by the first cluster 100-1. In order to immediately execute the application that has been executed by the first cluster 100-1, the second cluster 100-2 may change the state thereof from a standby state to an active state.

According to an embodiment of the disclosure, for real-time synchronization, synchronization pods included in a cluster need to be running even in a standby state. That is, the standby state for real-time synchronization may refer to a state in which the synchronization pods included in the cluster are running and also providing service.

For such real-time synchronization, a service pod may be required to be running even in a standby state. That a service pod is running in a standby state may indicate a state where the service pod is running but not providing service.

Hereinafter, with reference to FIG. 2, a scenario where an active state of the first cluster 100-1 is changed to an abnormal state due to an abnormal situation, the second cluster 100-2 immediately executes an application through data synchronization is described in greater detail.

Figure 2:
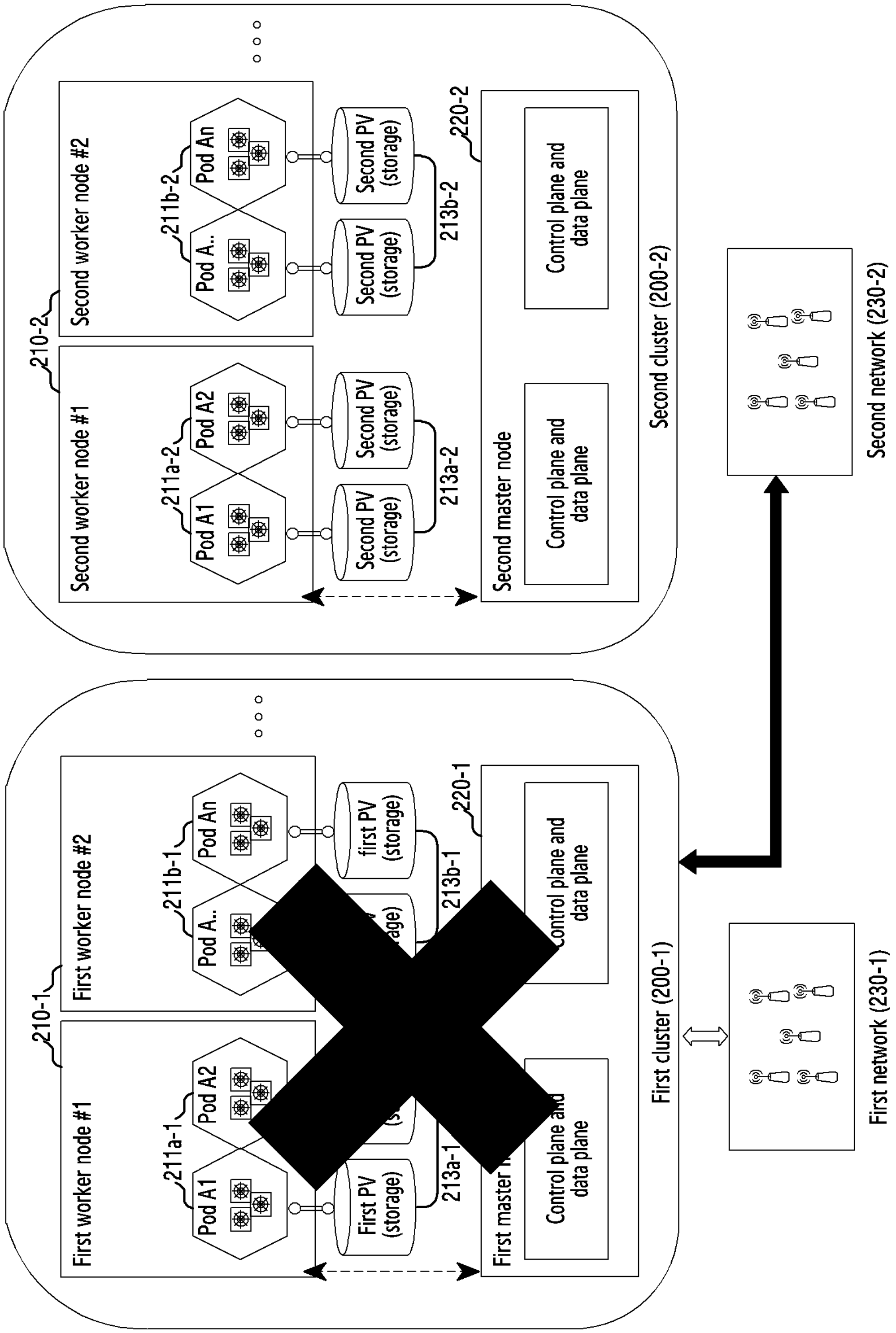
FIG. 2 is a diagram illustrating a scenario of a case where an abnormal state arises due to an abnormal situation in an environment for controlling a cluster application in a container-based cluster according to various embodiments.

FIG. 2 is a diagram illustrating an example scenario of a case where an abnormal state arises due to an abnormal situation in a container-based cluster environment for real-time data synchronization according to various embodiments.

Referring to FIG. 2, a network environment may include a first cluster 200-1 and a second cluster 200-2. Although FIG. 2 illustrates clusters including the first cluster 200-1 and the second cluster 200-2, this is merely for convenience of explanation and does not exclude an environment in which an additional cluster exists. The network environment may include a first network 230-1 and a second network 230-2. Although FIG. 2 illustrates networks including the first network 230-1 and the second network 230-2, this is merely for convenience of explanation and does not exclude an environment in which three or more networks exist.

According to an embodiment of the disclosure, the description of a cluster may be used to refer to the description of an EMS included in the cluster. The state of a cluster may be used in the same sense as the state of an EMS included in the cluster. For example, the state of the first cluster 200-1 may be used in the same sense as the state of a first EMS included in the first cluster. For example, the state of the second cluster 200-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

The first cluster 200-1 may include one or more first worker nodes 210-1, one or more first persistent volumes (PVs) 213*a*-1 and 213*b*-1, and a first master node 220-1. Each of the one or more first worker nodes 210-1 may include one or more first pods 211*a*-1 or 211*b*-1, and the one or more first pods 211*a*-1 or 211*b*-1 may be connected to the one or more first PVs 213*a*-1 or 213*b*-1, respectively. The first cluster 200-1 may communicate with the first network 230-1. The first cluster 200-1 may communicate with the second network 230-2. The first network 230-1 and the second network 230-2 may be distinguished logically or geographically.

The second cluster 200-2 may be distinguished from the first cluster 200-1 logically or geographically. The second cluster 200-2 may include one or more second worker nodes 210-2, one or more second PVs 213*a*-2 and 213*b*-2, and a second master node 220-2. Each of the one or more second worker nodes 210-2 may include one or more second pods 211*a*-2 or 211*b*-2, and the one or more second pods 211*a*-2 or 211*b*-2 may be connected to the one or more second PVs 213*a*-2 or 213*b*-2, respectively. The second cluster 200-2 may communicate with the first network 230-1. The second cluster 200-2 may communicate with the second network 230-2.

Hereinafter, the descriptions of each of the first cluster 200-1 and the second cluster 200-2 may be applied as a description of a cluster. The descriptions of each of the one or more first worker nodes 210-1 and the one or more second worker nodes 210-2 may be applied as a description of a worker node. The descriptions of each of the one or more first pods 211*a*-1 and 211*b*-1 and the one or more second pods 211*a*-2 and 211*b*-2 may be applied as a description of a pod. The descriptions of each of the one or more first PVs 213*a*-1 and 213*b*-1 and the one or more second PVs 213*a*-2 and 213*b*-2 may be applied as a description of a PV. The descriptions of each of the first master node 220-1 and the second master node 220-2 may be applied as a description of a master node. The descriptions of each of the first network 230-1 and the second network 230-2 may be applied as a description of a network.

Referring to FIG. 2, it may be noted that an abnormal situation has occurred in the first cluster 200-1. For example, the abnormal situation may be an abnormal situation of a pod or an abnormal situation of an infra. The abnormal situation may include a worker node crash, a cluster-level crash, a storage crash, or abnormality of an independent service or network.

According to an embodiment of the disclosure, when an abnormal situation occurs in the first cluster 200-1 and the state thereof becomes an abnormal state, the second cluster 200-2 may change from a standby state to an active state. Through real-time synchronization, even if the state of the first cluster 200-1 changes from an active state to a standby state or an abnormal state due to an abnormal situation, the second cluster 200-2 may immediately execute an application that has been executed by the first cluster 200-1. This may be because the one or more first PVs 213*a*-1 and 213*b*-1 included in the first cluster 200-1 have been synchronized in real time with the one or more second PVs 213*a*-2 and 213*b*-2 included in the second cluster 200-2. Real-time synchronization may be performed by the one or more first pods 211*a*-1 and 211*b*-1 included in the first cluster 200-1 and the one or more second pods 211*a*-2 and 211*b*-2 included in the second cluster 200-2. Through real-time synchronization, even if the state of the first cluster 200-1 changes to an abnormal state due to an abnormal situation, the second cluster 200-2 may immediately execute an application that has been executed by the first cluster 200-1. The identification of the abnormal state may be performed by a HA pod.

For such real-time synchronization, a synchronization pod may be required to be running even in a standby state. That a synchronization pod is running in a standby state may indicate a state where the synchronization pod is running and providing service.

The synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization.

In addition, for such real-time synchronization, a service pod may be required to be running even in a standby state. That a service pod is running in a standby state may indicate a state where the service pod is running but not providing service. This will be described in greater detail below with reference to FIG. 3.

Figure 3:
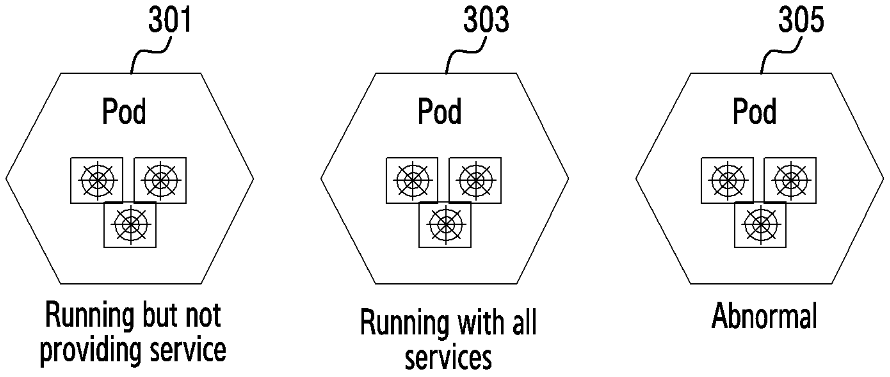
FIG. 3 is a diagram illustrating an example state of a pod included in a container-based cluster according to various embodiments.

FIG. 3 is a diagram illustrating a state of a pod according to various embodiments.

Referring to FIG. 3, a pod may include three states. For example, the three states of the pod may be represented as a pod 301 that is running but not providing service, a pod 303 that is running and providing service, and a pod 305 that is in an abnormal state. The three states of the pod may all be controlled by an EMS. Although only the three states of the pod are illustrated in FIG. 3, this is merely for convenience of explanation and does not exclude an additional state. This will be described in greater detail below with reference to FIG. 5.

According to an embodiment of the disclosure, the description of a cluster may be used to refer to the description of an EMS included in the cluster. In addition, the state of a cluster may be used in the same sense as the state of an EMS included in the cluster. For example, the state of a first cluster may be used in the same sense as the state of a first EMS included in the first cluster. For example, the state of a second cluster may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

A synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization.

The pod 301 that is running but not providing service may indicate a service pod in a cluster in a standby state. The pod may be controlled by the EMS of the cluster, and may be a part of the EMS of the cluster. The cluster in the standby state does not execute service but needs to execute a service pod for data synchronization. Being in a running state may indicate that the pod is running for an EMS service. In addition, the pod running may indicate that the pod is running for data synchronization even in the standby state. The data may include file data and data for application execution. A file may refer to data stored in the cluster, and the data for application execution may be data related to an application being executed by the EMS. Not providing service may indicate that a service for executing an EMS service application is not being provided. This may refer, for example, to a state where the EMS service application is not executed. The pod 301 in a state of running but not providing service may indicate a state where only an initialization container is loaded and other containers are not loaded.

The pod 303 that is running and providing service may indicate a service pod in a cluster in an active state. In addition, a synchronization pod, which is distinguished from a service pod, may be the pod 303 that is running and providing service regardless of an active state or a standby state. The pod may be controlled by the EMS of the cluster, and may be a part of the EMS of the cluster. Providing service may indicate that a service for executing an EMS service application is being provided. This may refer, for example, to the EMS service application running. A synchronization pod is running in cluster 1 and cluster 2 and thus may perform data synchronization. That is, the synchronization pod may transmit data to another pod. The data may include file data and data for application execution. A file may refer to data stored in the cluster, and the data for application execution may be data related to an application being executed by the EMS.

The abnormal pod 305 may indicate a pod in a cluster in an abnormal state. The pod may be controlled by the EMS of the cluster, and may be a part of the EMS of the cluster. The cluster in the abnormal state may be generated due to a pod that is not executed. The pod is not executed because of an abnormal situation. The abnormal situation is an abnormal situation of the EMS and, for example, may be an abnormal situation of a pod or an abnormal situation of an infra. The abnormal situation of the infra may include a worker node crash, a cluster-level crash, a storage crash, or abnormality of an independent service or network.

The states of a pod have been described with reference to FIG. 3. Based on FIG. 4, the types of a pod are explained in greater detail.

Figure 4:
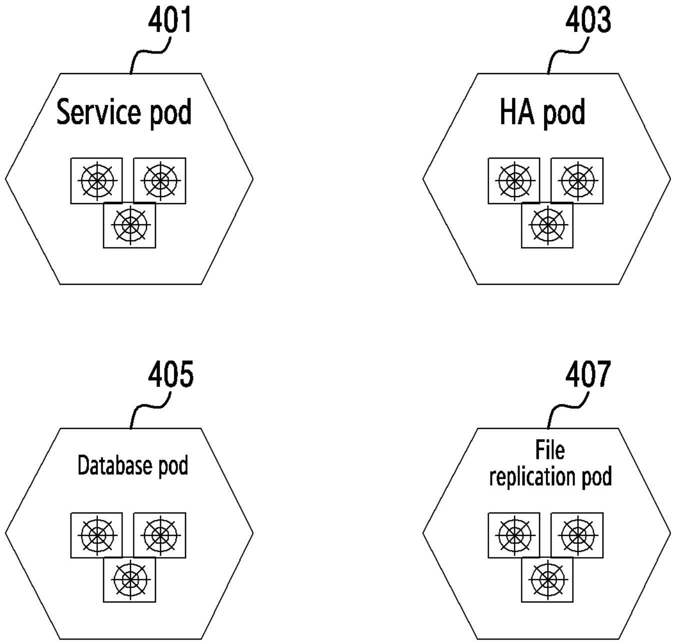
FIG. 4 is a diagram illustrating a type of a pod included in a container-based cluster according to various embodiments.

FIG. 4 is a diagram illustrating an example type of a pod according to various embodiments.

Referring to FIG. 4, a pod may include four types. For example, the four types of a pod may include a service pod 401, a HA pod 403, a database pod 405, and a file replication pod 407. Although only the four types of the pod are illustrated in FIG. 4, this is merely for convenience of explanation and does not exclude another type. For example, the service pod 401, the HA pod 403, the database pod 405, and the file replication pod 407 may all be controlled by an EMS. The HA pod 403, the database pod 305, and the file replication pod 307, excluding the service pod 401, may be included in a synchronization pod.

According to an embodiment of the disclosure, the description of a cluster may be used to refer to the description of an EMS included in the cluster. In addition, the state of a cluster may be used in the same sense as the state of an EMS included in the cluster. For example, the state of a first cluster may be used in the same sense as the state of a first EMS included in the first cluster. For example, the state of a second cluster may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

The service pod 401 may indicate a pod capable of executing an EMS application. If the cluster is in an active state, the pod is in a state of running and being capable of providing service and thus may execute the application. That is, when the cluster is in an active state, the service pod 401 may be the pod 303 that is running and providing service. If an application included in a container-based cluster is a state-dependent (stateful) application, when a cluster is in an active state, another cluster may need to maintain a standby state. If a cluster is in an active state, the other cluster needs to be in a standby state, and the standby state may indicate a state where the service pod 401 is running but not providing service. In such a standby state of the cluster, the service pod 401 may be the pod 301 that is running but not providing service. In the standby state, the service pod 401 may not be providing service but may need to be running for data synchronization. The data may include file data and data for application execution. A file may refer to data stored in the cluster, and the data for application execution may be data related to an application being executed by the EMS.

The HA pod 403 is a high availability pod and may indicate a pod that determines a state. The HA pod 403 may identify the state of the cluster. In order to identify the state of the cluster, the HA pod 403 may be required to be running and providing service regardless of the state of the cluster. For example, even in a standby state, the HA pod 403 may need to be providing service in order to identify the state of the cluster. That is, the HA pod 403 may be the pod 303 that is running and providing service regardless of a state.

According to an embodiment of the disclosure, the HA pod 403 may identify the state of a cluster of the HA pod. For example, the HA pod 403 may also identify the state of another cluster. In addition, the HA pod 403 may identify the state of a cluster and change the state of the cluster. For example, if a cluster of the HA pod is in a standby state and another cluster is a standby state, the HA pod may change, into an active state, the state of the cluster of the HA pod. For example, if a cluster of the HA pod is in a standby state and another cluster is a standby state, the HA pod may change the state of the other cluster into an active state. For example, if a cluster of the HA pod is in an active state and another cluster is an active state, the HA pod may change, into a standby state, the state of the cluster of the HA pod. For example, if a cluster of the HA pod is in an active state and another cluster is an active state, the HA pod may change the state of the other cluster into a standby state. Changing the state of the cluster may be based on priority.

The database pod 405 may be a pod for database synchronization. The database pod 405 may synchronize a database between a PV of a cluster of the database pod and a PV of another cluster. For data synchronization, the database pod needs to provide service regardless of the state of the cluster. That is, the database pod 405 may be the pod 303 that is running and providing service regardless of the state of the cluster. This is to enable the database pod to immediately execute, in the cluster of the database pod, an application that has been being previously executed in another cluster when the state of the other cluster is changed from an active state to a standby state or an abnormal state due to an abnormal situation.

The file replication pod 407 may be a pod for file synchronization. The file may indicate data stored in the cluster. The file replication pod 407 may synchronize a file between a PV of a cluster of the file replication pod and a PV of another cluster. For file synchronization, the file replication pod may need to provide service regardless of the state of the cluster. That is, the file replication pod 407 may be the pod 303 that is running and providing service regardless of the state of the cluster. This is to enable the file replication pod to store, in real time, a file for immediately executing, in the cluster of the file replication pod, an application that has been being previously executed in another cluster when the state of the other cluster is changed from an active state to a standby state or an abnormal state due to an abnormal situation.

The types and roles of a pod are described with reference to FIG. 4. Based on FIG. 5, the lifecycle of a pod is explained in greater detail.

Figure 5:
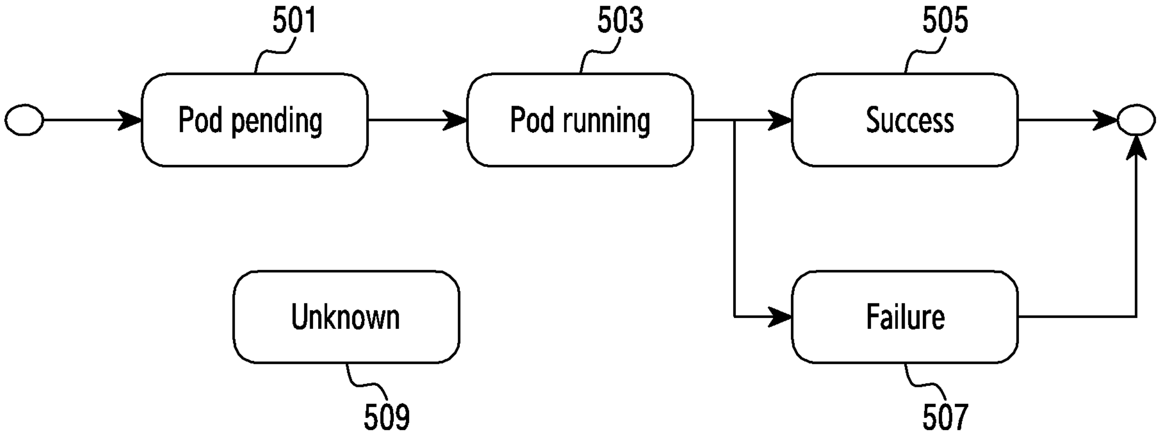
FIG. 5 is a diagram illustrating a lifecycle of a pod included in a container-based cluster according to various embodiments.

FIG. 5 is a diagram illustrating an example lifecycle of a pod according to various embodiments.

Referring to FIG. 5, a pod may include, for example, five states. For example, the five states of a pod may be represented as pod pending 501, pod running 503, success 505, failure 507, and unknown 509. The five states of the pod may all be controlled by an EMS. Although only the five types of the pod are illustrated in FIG. 5, this is merely for convenience of explanation and does not exclude an additional state.

According to an embodiment of the disclosure, the description of a cluster may be used to refer to the description of an EMS included in the cluster. In addition, the state of a cluster may be used in the same sense as the state of an EMS included in the cluster. For example, the state of a first cluster may be used in the same sense as the state of a first EMS included in the first cluster. For example, the state of a second cluster may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

The pod pending 501 may indicate a state in which the pod has been accepted but one or more containers have not been configured and are not ready to run. The state in which the pod is not ready to run may include not only a time before the pod is scheduled but also a time required to download a container image over a network.

The pod running 503 may refer, for example, to all containers of the pod having been generated and at least one container is still running or is in the process of starting or restarting.

The success 505 may refer, for example, to all containers in the pod being terminated successfully and is not restarted.

The failure 507 may refer, for example, to all containers in the pod being terminated and at least one container being terminated due to failure.

The unknown 509 may refer, for example, to it not being possible to obtain the state of the pod for some reason. This stage may generally occur due to a communication error with a node where the pod is required to be executed.

With reference to FIG. 5, the lifecycle of a pod has been explained. Based on FIG. 6, a process in which a pot executes an application is explained in greater detail.

Figure 6:
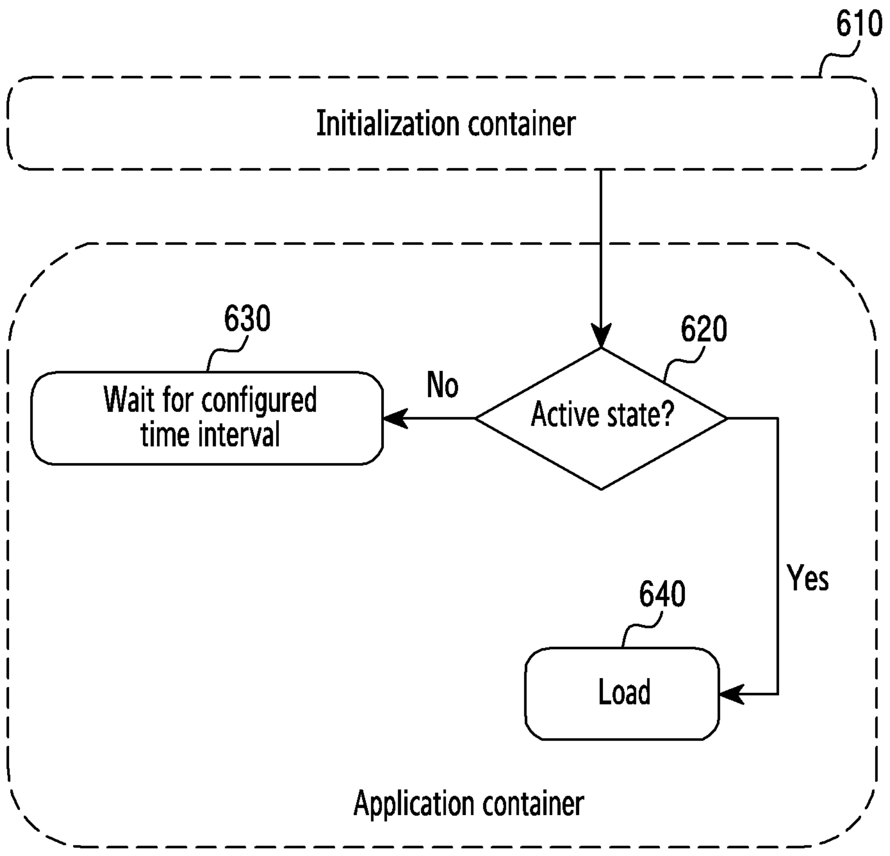
FIG. 6 is a flowchart illustrating an example process in which a pod included in a container-based cluster executes an application according to various embodiments.

FIG. 6 is a flowchart illustrating an example process in which a pod executes an application according to various embodiments.

According to an embodiment of the disclosure, the description of a cluster may be used to refer to the description of an EMS included in the cluster. In addition, the state of a cluster may be used in the same sense as the state of an EMS included in the cluster. For example, the state of a first cluster may be used in the same sense as the state of a first EMS included in the first cluster. For example, the state of a second cluster may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

Referring to FIG. 6, in stage 610, an EMS may identify an initialization container (init container). The init container may be a container in which all required resources have been executed. According to an embodiment of the disclosure, a pod included in the EMS of the init container in the container may be the pod 301 in a state of running but not providing service. That is, the pod 301 in a state of running but not providing service may indicate a state where only an init container is loaded and other containers are not loaded.

In stage 620, the EMS may identify whether a container is in an active state. This is to execute an application when the container is in an active state. According to an embodiment of the disclosure, a service pod in an active state may be the pod 303 in a state of running and providing service. If the state of the current container is a standby state, stage 630 may proceed. If the state of the current container is an active state, stage 640 may proceed. According to an embodiment of the disclosure, identifying of the state may be performed by the HA pod 403 included in the EMS.

In stage 630, the EMS may wait for a configured time interval. According to an embodiment of the disclosure, a pod included in the EMS of the container may be the pod 301 in a state of running but not providing service.

In stage 640, the EMS may execute an application. A service pod in an active state may be the pod 303 in a state of running and providing service.

With reference to FIG. 6, a process in which a pot executes an application has been explained. Based on FIG. 7, a case where an abnormal state arises on a pod is described in greater detail.

Figure 7:
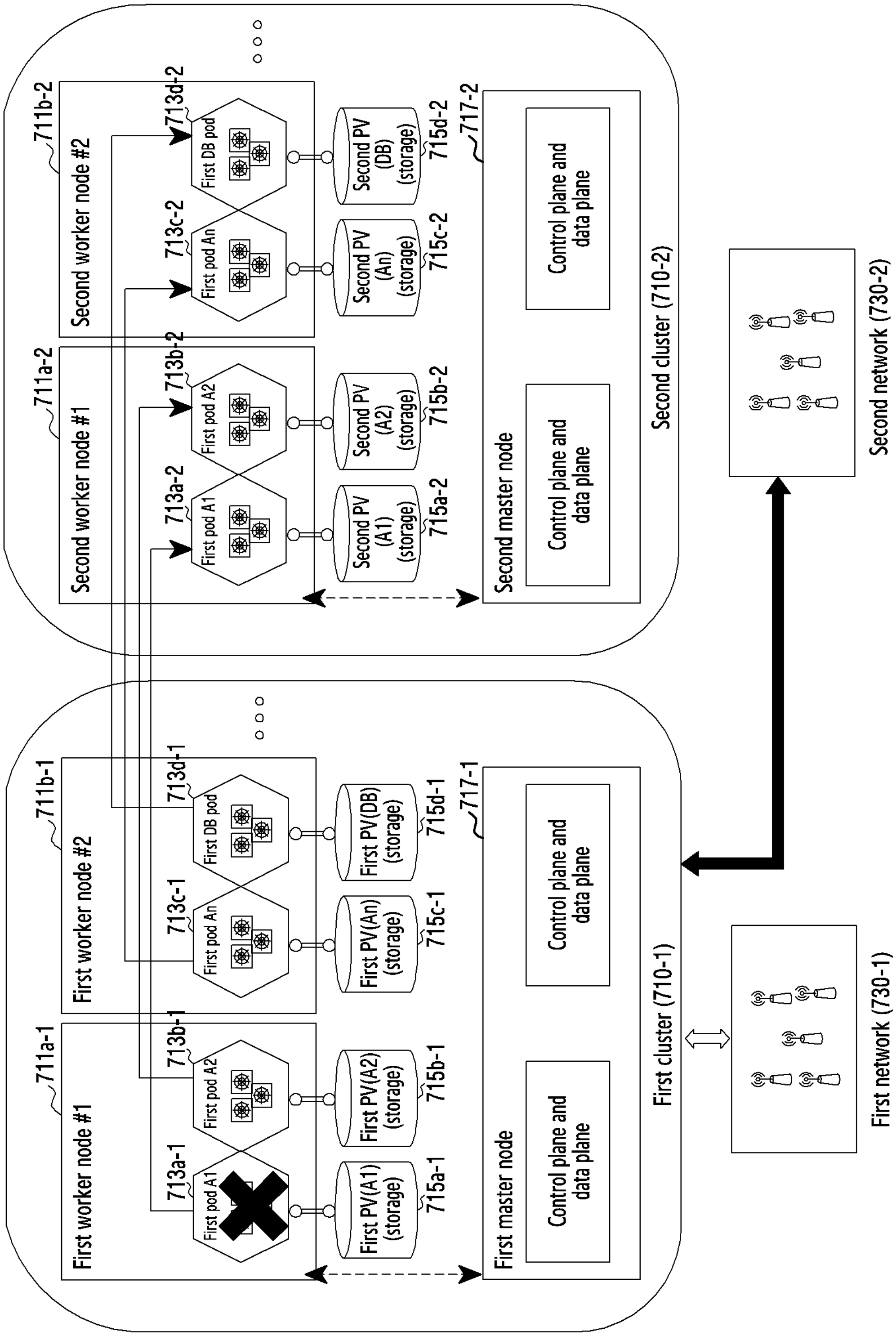
FIG. 7 is a diagram illustrating a scenario of a case where an abnormal state arises on a pod in an environment for controlling a cluster application in a container-based cluster according to various embodiments.

FIG. 7 is a diagram illustrating a scenario of a case where an abnormal state arises on a pod in a container-based cluster environment according to various embodiments.

Referring to FIG. 7, a network environment may include a first cluster 710-1 and a second cluster 710-2. Although FIG. 7 illustrates clusters including the first cluster 710-1 and the second cluster 710-2, this is merely for convenience of explanation and does not exclude an environment in which an additional cluster exists. In addition, the network environment may include a first network 730-1 and a second network 730-2. Although FIG. 7 illustrates networks including the first network 730-1 and the second network 730-2, this is merely for convenience of explanation and does not exclude an environment in which three or more networks exist.

In addition, FIG. 7 illustrates that a first pod A1 713*a*-1 is in an abnormal state. However, this is merely for convenience of explanation and does not exclude an environment where a pod other than the first pod A1 713*a*-1 is in an abnormal state.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 710-1 may be used in the same sense as the state of a first EMS included in the first cluster. For example, the state of the second cluster 710-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

The first cluster 710-1 may include one or more first worker nodes 711*a*-1 and 711*b*-1, one or more first persistent volumes (PVs) 715*a*-1, 715*b*-1, 715*c*-1, and 715*d*-1, and a first master node 717-1. The first worker node #1 711*a*-1 may include the first pod A1 713*a*-1 and a first pod A2 713*b*-1. The first worker node #2 may include a first pod A3 713*c*-1 and a first pod A4 713*d*-1. The one or more first pods 713*a*-1, 713*b*-1, 713*c*-1, and 713*d*-1 may be connected to the one or more first PVs 715*a*-1, 715*b*-1, 715*c*-1, and 715*d*-1, respectively. The first cluster 710-1 may communicate with the first network 730-1. The first cluster 710-1 may communicate with the second network 730-2. The first network 730-1 and the second network 730-2 may be distinguished logically or geographically. The one or more first worker nodes 711*a*-1 and 711*b*-1 are represented as two worker nodes, but this is merely for convenience of explanation and does not exclude an additional worker node. In addition, each of the one or more first worker nodes 711*a*-1 and 711*b*-1 is represented to include two pods, but this is merely for convenience of explanation and does not exclude inclusion of an additional pod.

The second cluster 710-2 may be distinguished from the first cluster 710-1 logically or geographically. The second cluster 710-2 may include one or more second worker nodes 711*a*-2 and 711*b*-2, one or more second PVs 713*a*-2, 713*b*-2, 713*c*-2, and 713*d*-2, and a second master node 717-2. The second worker node #1 711*a*-2 may include a second pod A1 713*a*-2 and a second pod A2 713*b*-2. The second worker node #2 may include a second pod A3 713*c*-2 and a second pod A4 713*d*-2. The one or more second pods 713*a*-2, 713*b*-2, 713*c*-2, and 713*d*-2 may be connected to the one or more second PVs 713*a*-2, 713*b*-2, 713*c*-2, and 713*d*-2, respectively. The second cluster 710-2 may communicate with the first network 730-1. The second cluster 710-2 may communicate with the second network 730-2. The one or more second worker nodes 711*a*-2 and 711*b*-2 are represented as two worker nodes, but this is merely for convenience of explanation and does not exclude an additional worker node. In addition, each of the one or more second worker nodes 711*a*-2 and 711*b*-2 is represented to include two pods, but this is merely for convenience of explanation and does not exclude inclusion of an additional pod.

Hereinafter, the descriptions of each of the first cluster 710-1 and the second cluster 710-2 may be applied as a description of a cluster. The descriptions of each of the one or more first worker nodes 711*a*-1 and 711*b*-1 and the one or more second worker nodes 711*a*-2 and 711*b*-2 may be applied as a description of a worker node. The descriptions of each of the one or more first pods 713*a*-1, 713*b*-1, 713*c*-1, and 713*d*-1 and the one or more second pods 713*a*-2, 713*b*-2, 713*c*-2, and 713*d*-2 may be applied as a description of a pod. The descriptions of each of the one or more first PVs 715*a*-1, 715*b*-1, 715*c*-1, and 715*d*-1 and the one or more second PVs 715*a*-2, 715*b*-2, 715*c*-2, and 715*d*-2 may be applied as a description of a PV. The descriptions of each of the first master node 717-1 and the second master node 717-2 may be applied as a description of a master node. The descriptions of each of the first network 730-1 and the second network 730-2 may be applied as a description of a network.

According to an embodiment of the disclosure, the first cluster 710-1 may be a cluster in an active state. According to an embodiment of the disclosure, the second cluster 710-2 may be a cluster in a standby state. A cluster in an active state may refer to a state in which service pods included in the cluster are running and providing service. A cluster in a standby state may refer to a state in which service pods included in the cluster are running but not providing service. Here, a synchronization pod, which is distinguished from a service pod, may indicate a state where the pod that is running and providing service regardless of an active state or a standby state. A synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization.

Referring to FIG. 7, it may be noted that an abnormal situation has occurred on the first pod A1 713*a*-1. For example, the abnormal situation may include a worker node crash, a cluster-level crash, a storage crash, or abnormality of an independent service or network.

According to an embodiment of the disclosure, when an abnormal situation occurs in the first cluster 710-1 and the state thereof becomes an abnormal state, the second cluster 710-2 may change from a standby state to an active state. Through real-time synchronization, even if the state of the first cluster 710-1 changes from an active state to a standby state or an abnormal state due to an abnormal situation, the second cluster 710-2 may immediately execute an application that has been executed by the first cluster 710-1. This may be because the one or more first PVs 715*a*-1 and 715*b*-1 included in the first cluster 710-1 have been synchronized in real time with the one or more second PVs 715*a*-2 and 715*b*-2 included in the second cluster 710-2. Real-time synchronization may be performed by the one or more first pods 111*a*-1 and 111*b*-1 included in the first cluster 710-1 and the one or more second pods 713*a*-2, 713*b*-2, 713*c*-2, and 713*d*-2 included in the second cluster 710-2. Through real-time synchronization, even if the state of the first cluster 710-1 changes to an abnormal state due to an abnormal situation, the second cluster 710-2 may immediately execute an application that has been executed by the first cluster 710-1. The identification of the abnormal state may be performed by a HA pod included in the first cluster 710-1.

According to an embodiment of the disclosure, when an abnormal situation occurs in the first cluster 710-1 and the state thereof becomes an abnormal state, the second cluster 710-2 may change from a standby state to an active state. The identification of the abnormal state may be performed by a HA pod included in the first cluster 710-1. Here, there may be a problem as to whether an abnormal state of the first pod A1 713*a*-1 may be considered as an abnormal state of the first cluster 710-1. If the first pod A1 713*a*-1 is an important pod when an EMS service application is executed, when an abnormal state of the first pod A1 713*a*-1 arises, the first cluster 710-1 may need to be changed to a standby state. If the first pod A1 713*a*-1 is an unimportant pod when an EMS service application is executed, even when an abnormal state of the first pod A1 713*a*-1 arises, the first cluster 710-1 may not need to be changed to a standby state.

Therefore, in the disclosure, a method of identifying whether there arises an abnormal state at a cluster level according to the importance level of a pod is described in detail. The method is described in reference to [Table 1] as below.

TABLE 1

| Algorithm at cluster level<br>S-EMS Health check decision Algorithm |
|---|
| Assumptions:<br>S(X): Service or POD health in cluster X<br>D(X): Threshold value to be considered for abnormality of Health of the cluster.<br>K(X): configured count for failure or retry<br>$S(X) = \Sigma_j Ss_i * Sw_i$ where $ss_i$ is service status with 1 or 0 value based on running or stopped and $SW_i$is service weightage.<br>Output: S-EMS Application Health Status<br>Initialisation: Assume there are 'T' Services/Pods and retry count is global variable |

```
threshold = 0;
retryCount=0;   // Global variable
LOOP Process
    for [i = 1] to [T] do
        threshold = threshold + Ss_i * Sw_i
    end for
  if [threshold < D(X)] then
    retryCount = retryCount + 1
  end if
 if [threshold >= D(X)] then
     retryCount=0
 end if
if [retryCount > K(X) ] then
    retryCount = 0;
    return false;
end if
return true;
```

In [Table 1], S(X) indicates a health value of all the pods in cluster X, D(X) denotes a threshold value used to consider the health value of cluster X as an abnormal state, and K(X) may represent the number of times of comparison between S(X) and D(X). S(X) may be calculated by [Equation 1] as below.

$$S(X) = \sum_j Ss_i * Sw_i \quad \text{[Equation 1]}$$

In [Equation 1], S(X) indicates a health value of all the pods in cluster X, $Ss_i$ indicates whether the i-th pod is in an active state or an abnormal state, and $Sw_i$ may indicate a weight of the i-th pod. $Ss_i$ is equal to 1 if the i-th pod is in an active state, and is equal to 0 if same is in an abnormal state. In addition, the sum of weights of all the pods may be 1. This may be represented through [Equation 2].

$$S(X) = \sum_j Sw_i = 1 \quad \text{[Equation 2]}$$

A user of an EMS service application may configure the weight $Sw_i$ for pod i, and configure a threshold value between 0 and 1. In addition, the weight $Sw_i$ and the threshold value may be configured in advance.

In addition, in [Table 1], even after a repetition is performed K(X) times, if the threshold value is not exceeded, cluster X may be identified as being in an abnormal state at a cluster level. The user of the EMS service application may configure a value of K(X). In addition, K(X) may also be configured in advance.

With reference to FIG. 7 and [Table 1], a process in which an abnormal state is identified at a cluster level according to the weight of a pod has been described. Based on FIG. 8, a process of identifying an abnormal state at a pod level is described. The identification of an abnormal state at a pod level is to identify whether a value of $Ss_i$ for the i-th pod is 1 or 0. The identification of an abnormal state at a pod level is to identify whether each pod is in an active state or an abnormal state.

Figure 8:
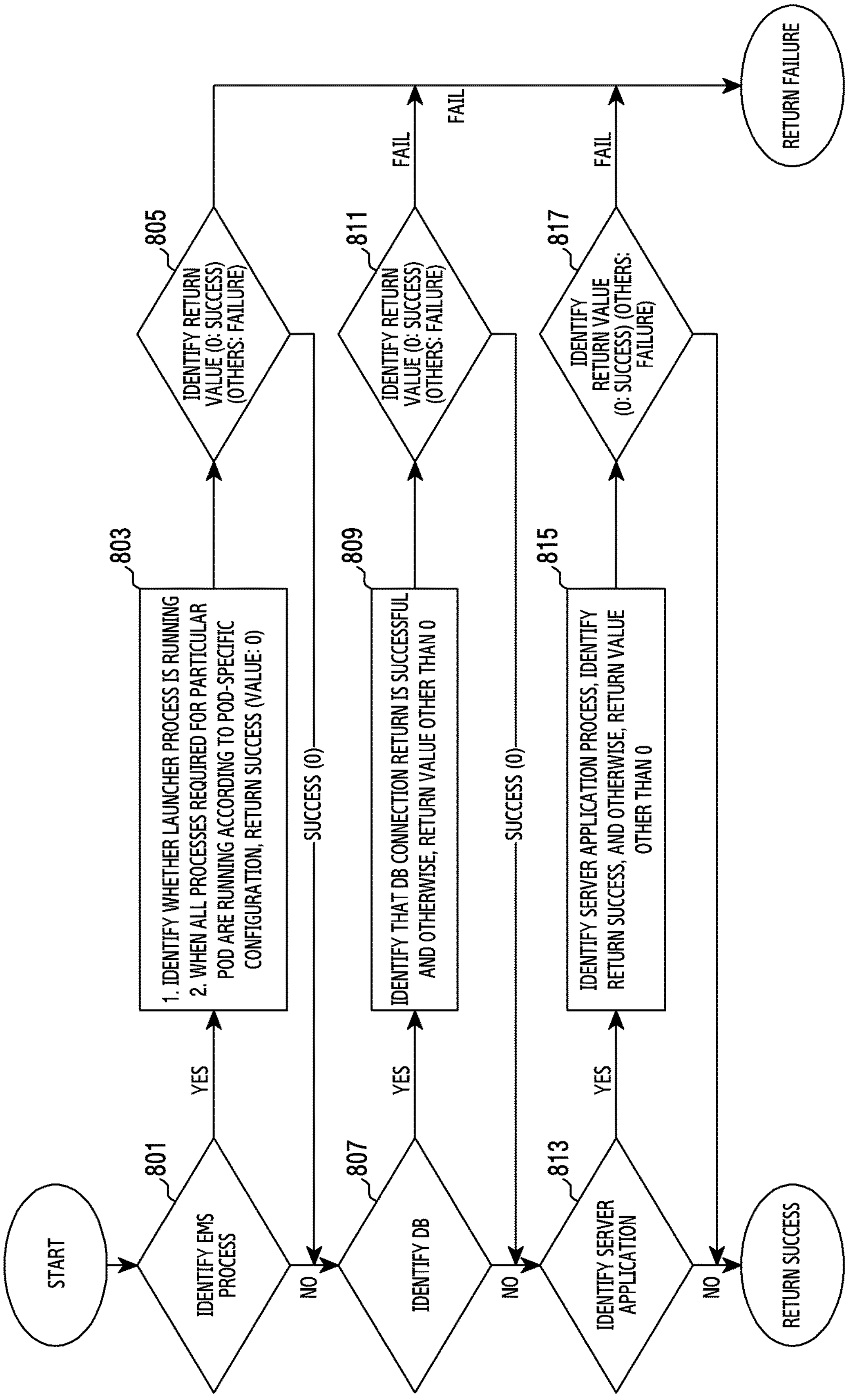
FIG. 8 is a flowchart illustrating an example method of identifying an abnormal state caused by an abnormal situation of a pod in a container-based cluster environment according to various embodiments.

FIG. 8 is a flowchart illustrating an example method of identifying an abnormal state caused by an abnormal situation of a pod in a container-based cluster environment according to various embodiments.

Referring to FIG. 8, a pod is illustrated to be identified as being in an abnormal state through three stages. The three stages are merely for convenience of explanation and do not exclude an additional stage.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 710-1 may be used in the same sense as the state of a first EMS included in the first cluster. For example, the state of the second cluster 710-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

According to an embodiment of the disclosure, the first cluster 710-1 may identify an EMS process for each pod (stage 801). An i-th pod may correspond to $Ss_i$. According to an embodiment of the disclosure, the identifying of the EMS process for each pod may be a procedure of identifying whether a pod required for an application execution procedure when an EMS service application is executed operates normally. For example, the identifying of the EMS process may be a procedure of identifying whether a service pod required for the procedure in the EMS service application operates normally. For example, in a case where this procedure proceeds to identify an abnormal state for the i-th pod $Ss_i$, when the i-th pod $Ss_i$ is a service pod required for the procedure in the EMS service application, stage 803 may proceed. For example, in a case where this procedure proceeds to identify an abnormal state for the i-th pod $Ss_i$, when the i-th pod $Ss_i$ is not a service pod required for the procedure in the EMS service application, stage 807 may proceed.

According to an embodiment of the disclosure, if the i-th pod $Ss_i$ is a service pod required for the procedure in the EMS service application, the first cluster 710-1 identifies a launcher process (stage 803). For example, the first cluster 710-1 may identify whether a launcher process is running for the i-th pod $Ss_i$. For example, the first cluster 710-1 may identify whether all processes required for a launcher process are running for the i-th pod $Ss_i$.

According to an embodiment of the disclosure, the first cluster 710-1 may identify a return value (stage 805). For example, if the return value is 0, the first cluster may determine return success. For example, the first cluster may recognize, through the return success, that there is no problem for the i-th pod $Ss_i$ that is a service pod required for the procedure in the EMS service application. If the return value is 0, stage 807 may proceed. According to an embodiment of the disclosure, if the return value is not 0, the service pod required for the procedure in the EMS service application may be determined as being in an abnormal state. For example, if the return value is 0 for the i-th pod $Ss_i$, $Ss_i$ may be determined as being in an abnormal state.

According to an embodiment of the disclosure, if a pod to be identified for an abnormal state is not a service pod required for the procedure in the EMS service application and thus does not require identifying of the EMS process by the first cluster in stage 801, stage 807 may proceed.

According to an embodiment of the disclosure, the first cluster 710-1 may identify a database for each pod (stage 807). The i-th pod may correspond to $Ss_i$. According to an embodiment of the disclosure, the identifying of the database for each pod may be a procedure of identifying whether one of synchronization pods operates normally. According to an embodiment of the disclosure, the identifying of the database for each pod may be a procedure of identifying whether the HA pod 403 operates normally. According to an embodiment of the disclosure, the identifying of the database for each pod may be a procedure of identifying whether the database pod 405 operates normally. According to an embodiment of the disclosure, the identifying of the database for each pod may be a procedure of identifying whether the file replication pod 407 operates normally. For example, in a case where this procedure proceeds to identify an abnormal state for the i-th pod $Ss_i$, when the i-th pod $Ss_i$ is a synchronization pod, stage 809 may proceed. For example, in a case where this procedure proceeds to identify an abnormal state for the i-th pod $Ss_i$, when the i-th pod $Ss_i$ is not a synchronization pod, stage 813 may proceed. The synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization.

According to an embodiment of the disclosure, if the i-th pod $Ss_i$ is a synchronization pod, the first cluster 710-1 identifies whether a database connection return is successful (stage 809). For example, the first cluster 710-1 may identify a connection state for the synchronization pod. For example, the first cluster 710-1 may identify, for the i-th pod $Ss_i$, a connection state for the synchronization pod. For example, if the first cluster 710-1 has succeed in identifying, for the i-th pod $Ss_i$, a connection state for the synchronization pod, a return value may be 0. For example, if the first cluster 710-1 has failed to identify, for the i-th pod $Ss_i$, a connection state for the synchronization pod, a return value may not be 0.

According to an embodiment of the disclosure, the first cluster 710-1 may identify a return value (stage 811). For example, if the return value is 0, the first cluster may determine return success. For example, the first cluster may recognize, through the return success, that there is no problem for the i-th pod $Ss_i$ that is a synchronization pod. If the return value is 0, stage 813 may proceed. According to an embodiment of the disclosure, if the return value is not 0, the service pod required for the procedure in the EMS service application may be determined as being in an abnormal state. For example, if the return value is 0 for the i-th pod $Ss_i$, $Ss_i$ may be determined as being in an abnormal state.

According to an embodiment of the disclosure, if a pod to be identified for an abnormal state is not a synchronization pod and thus does not require identifying of the database in stage 807, stage 813 may proceed.

According to an embodiment of the disclosure, the first cluster 710-1 may identify a server application for each pod (stage 813). The i-th pod may correspond to $Ss_i$. According to an embodiment of the disclosure, the identifying of the server application for each pod may be a procedure of identifying whether a pod related to a server required when an EMS service application is executed operates normally. For example, the identifying of the EMS process may be a procedure of identifying whether a service pod required for the server in the EMS service application operates normally. For example, in a case where this procedure proceeds to identify an abnormal state for the i-th pod $Ss_i$, when the i-th pod $Ss_i$ is a service pod required for the server in the EMS service application, stage 815 may proceed. For example, in a case where this procedure proceeds to identify an abnormal state for the i-th pod $Ss_i$, when the i-th pod $Ss_i$ is not a service pod required for the server in the EMS service application, Return success may proceed.

According to an embodiment of the disclosure, if the i-th pod $Ss_i$ is a service pod required for the server in the EMS service application, the first cluster 710-1 identifies a server application process (stage 815). For example, the first cluster 710-1 may identify whether a server application process is running for the i-th pod $Ss_i$. For example, the first cluster 710-1 may identify whether all processes required for execution of a server application are running for the i-th pod $Ss_i$.

According to an embodiment of the disclosure, the first cluster 710-1 may identify a return value (stage 817). For example, if the return value is 0, the first cluster may determine return success. For example, the first cluster may recognize, through the return success, that there is no problem for the i-th pod $Ss_i$ that is a service pod required for the server in the EMS service application. If the return value is 0, stage 807 may proceed. According to an embodiment of the disclosure, if the return value is not 0, the service pod required for the server in the EMS service application may be determined as being in an abnormal state. For example, if the return value is 0 for the i-th pod $Ss_i$, $Ss_i$ may be determined as being in an abnormal state.

According to an embodiment of the disclosure, if a pod to be identified for an abnormal state is not a service pod required for the server in the EMS service application and thus does not require identifying of the EMS process by the first cluster in stage 813, Return success may proceed.

Figure 9:
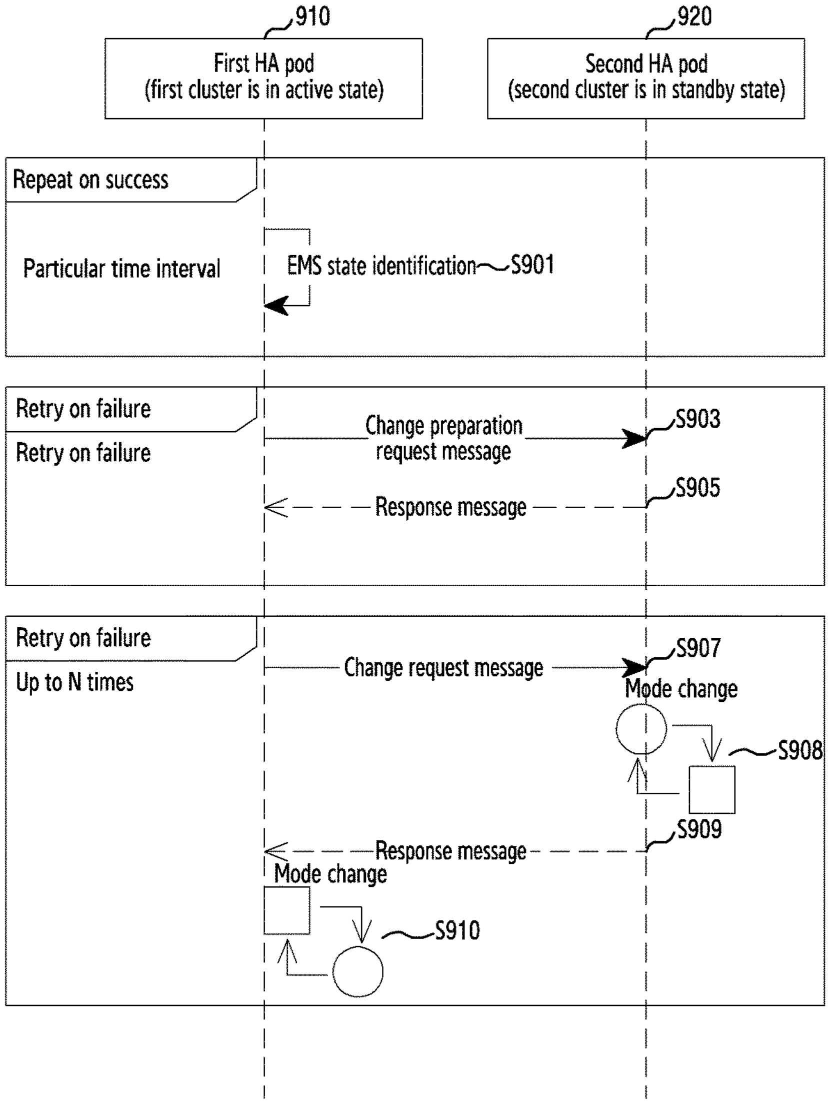
FIG. 9 is a signal flow diagram illustrating a case where a container-based cluster changes the state thereof when an abnormal state of the cluster arises due to an abnormal situation of a pod according to various embodiments.

With reference to FIG. 8 and a relevant description, a process of identifying an abnormal state for each pod has been described. FIG. 9 illustrates a procedure of changing a state of a cluster when an abnormal state of the cluster arises due to an abnormal situation of a pod.

FIG. 9 is a signal flow diagram illustrating an example case where a container-based cluster changes the state thereof when an abnormal state of the cluster arises due to an abnormal situation of a pod according to various embodiments.

Referring to FIG. 9, a first HA pod 910 may be the HA pod 403 included in the first cluster 710-1 in an active state. In addition, a second HA pod 920 may be the HA pod 403 included in the second cluster 710-2 in a standby state. According to an embodiment of the disclosure, if the first cluster 710-1 is in an abnormal state, changing the state of the second cluster 710-2 may be changing a state of a second EMS of the second cluster 710-2 from a standby state to an active state. The dotted lines shown in FIG. 9 may correspond to a response message for a request message. According to an embodiment of the disclosure, the second cluster 710-2 in a standby state may be a candidate cluster.

If an application included in a container-based cluster is a state-dependent (stateful) application, when a cluster is in an active state, another cluster may need to maintain a standby state.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 710-1 may be used in the same sense as the state of a first EMS included in the first cluster. For example, the state of the second cluster 710-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

According to an embodiment of the disclosure, the first HA pod 910 may identify a state of the first EMS operating in the first cluster 710-1 (stage S901). The first HA pod 910 may repeat EMS state identification according to a particular time interval. According to an embodiment of the disclosure, if the EMS state remains in an active state and is not an abnormal state, the first HA pod 910 may repeat EMS state identification according to a particular time interval. The EMS state identification may be identifying whether an abnormal state has arisen in units of clusters. The identifying of whether an abnormal state has arisen in the units of clusters has been described in detail with reference to FIG. 7. Whether an abnormal state has arisen in the units of clusters is determined by an abnormal state arising on a pod. Whether an abnormal state has arisen on a pod has been described in detail with reference to FIG. 8.

According to an embodiment of the disclosure, the first HA pod 910 may transmit a state change preparation request message to the second HA pod 920 (stage S903). The EMS state identification may be repeated N times. N times may correspond to a value of S(x) described with reference to FIG. 7. The first HA pod 910 may repeat EMS state identification N times when a result value of the EMS state identification corresponds to failure. According to an embodiment of the disclosure, the first HA pod 910 may transmit a state change preparation request message when a result of identifying a first EMS state indicates N times of failure. According to an embodiment of the disclosure, the state change preparation request message may be a preparation message for transmitting a state change request message. The first HA pod 910 transmits a state change request message according to a response message for the state change preparation request message.

According to an embodiment of the disclosure, the first HA pod 910 may receive a response message for the state change preparation request message from the second HA pod 920 (stage S905). According to an embodiment of the disclosure, the response message may include information indicating that the state of the second EMS of the second cluster 710-2 is changeable. Specifically, the response message may include information indicating that the state of the second EMS of the second cluster 710-2 is changeable from a standby state to an active state. The first HA pod 910 transmits a state change request message, based on the response message. According to an embodiment of the disclosure, the transmission (stage S905) of the response message may be omitted.

According to an embodiment of the disclosure, the first HA pod 910 may transmit a state change request message to the second HA pod 920 (stage S907). According to an embodiment of the disclosure, the first HA pod 910 may receive a response message and then transmit a state change request message. The state change request message may be a message indicating a change of the state of the second EMS of the second cluster 710-2 from a standby state to an active state. The second HA pod 920 may receive the state change request message and then change the state of the second EMS of the second cluster 710-2 (stage S908). For example, the second HA pod 920 may change the state of the second EMS of the second cluster 710-2 from a standby state to an active state. The transmission of the state change request message by the first HA pod 910 is to maintain, when the EMS of one cluster is in a standby state, the EMS of the other cluster to be in an active state. According to an embodiment of the disclosure, in a case where the EMS of one cluster is in a standby state, in order to change the state of the EMS of the other cluster to be an active state, when the state of the EMS of the first cluster 710-1 is changed to a standby state, the state of the second EMS of the second cluster 710-2 is required to be changed to an active state. If an abnormal state of the first EMS has been identified, the first HA pod needs to change the state of the first EMS of the first cluster 710-1 to a standby state. In this case, when the EMS of one cluster is in a standby state, in order to change the state of the EMS of the other cluster to be an active state, the state of the second EMS of the second cluster 710-2 is required to be changed to an active state.

According to an embodiment of the disclosure, the second HA pod 920 may, in response to the state change request message, change the state of the second EMS of the second cluster 710-2 from a standby state to an active state (stage S908).

According to an embodiment of the disclosure, the first HA pod 910 may receive a response message for the state change request message from the second HA pod 920 (stage S909). According to an embodiment of the disclosure, the response message may include information indicating that the state of the second EMS of the second cluster 710-2 has been changed. For example, the response message may include information indicating that the state of the second EMS of the second cluster 710-2 has been changed from a standby state to an active state. According to an embodiment of the disclosure, the transmission (stage S909) of the response message may be omitted. According to an embodiment of the disclosure, the first HA pod 910 may change the state of the first EMS of the first cluster 710-1, based on the response message (stage S910). For example, the first HA pod 910 may change the state of the first EMS of the first cluster 710-1 from an active state to a standby state.

Figure 10:
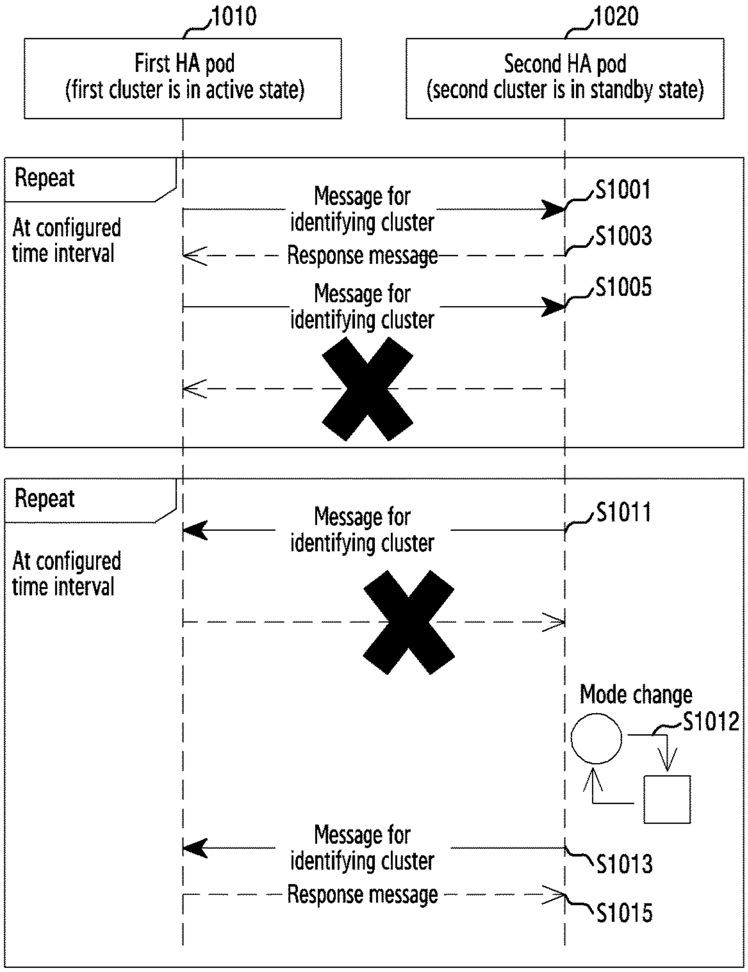
FIG. 10 is a signal flow diagram illustrating a case where a container-based cluster changes the state thereof when an abnormal state of another cluster arises according to various embodiments.

With reference to FIG. 9 and a relevant description, a procedure of changing a state of a cluster when an abnormal state of the cluster arises due to an abnormal situation of a pod has been described. FIG. 10 illustrates a procedure of changing a state of a cluster itself when an abnormal state of another cluster arises.

FIG. 10 is a signal flow diagram illustrating an example case where a container-based cluster changes the state thereof when an abnormal state of another cluster arises according to various embodiments.

Referring to FIG. 10, a first HA pod 1010 may be the HA pod 403 included in the first cluster 710-1 in an active state. In addition, a second HA pod 1020 may be the HA pod 403 included in the second cluster 710-2 in a standby state. According to an embodiment of the disclosure, if the first cluster 710-1 is in an abnormal state, changing the state of the second cluster 710-2 may be changing a state of a second EMS of the second cluster 710-2 from a standby state to an active state. The dotted lines shown in FIG. 10 may correspond to a response message for a request message. According to an embodiment of the disclosure, the second cluster 710-2 in a standby state may be a candidate cluster.

If an application included in a container-based cluster is a state-dependent (stateful) application, when a cluster is in an active state, another cluster may need to maintain a standby state.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 710-1 may be used in the same sense as the state of a first EMS included in the first cluster. For example, the state of the second cluster 710-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

In an embodiment, in a case where the first HA pod 1010 transmits a message for identifying the EMS of the second cluster 710-2:

According to an embodiment of the disclosure, the first HA pod 1010 may transmit a message for identifying the EMS of the cluster to the second HA pod 1020 (stage S1001). The first HA pod 1010 may transmit the message for identifying the EMS of the cluster at a configured time interval. The message for identifying the EMS of the cluster may be transmitted to identify the state of the EMS of the second cluster 710-2. According to an embodiment of the disclosure, the message for identifying the EMS of the cluster may be transmitted to identify whether the EMS of the second cluster 710-2 is in a standby state. The first HA pod 1010 may identify whether the EMS of the second cluster 710-2 is in a standby state so as to prepare for a case where an abnormal state arises in the first EMS. When an abnormal state arises in the first EMS, the first HA pod 1010 may transmit a state change request message to the second HA pod 1020.

According to an embodiment of the disclosure, the first HA pod 1010 may receive a response message from the second HA pod 1020 (stage S1003). The response message may include information indicating that the EMS may be a candidate EMS of a candidate cluster. The second HA pod 1020 may transmit, to the first HA pod 1010, a response message including information indicating that the second EMS of the second cluster 710-2 may be a candidate EMS of a candidate cluster. When the response message is received, the first HA pod 1010 may include the second EMS of the second cluster 710-2 in a candidate cluster. If the second EMS of the second cluster 710-2 is included as a candidate EMS of a candidate cluster, when failure occurs in the EMS operating in the first cluster 710-1, the second HA pod 1020 included in the second cluster 710-2 may be an object that receives a message indicating a change from a standby state to an active state. The second HA pod 1020 may transmit a response message to notify of eligibility as a candidate, thereby preparing for a case where failure has occurred in the first EMS operating in the first cluster 710-1.

According to an embodiment of the disclosure, the first HA pod 1010 may transmit a message for identifying the EMS of the cluster to the second HA pod 1020 (stage S1005). The first HA pod 1010 may transmit the message for identifying the EMS of the cluster at a configured time interval. The message for identifying the EMS of the cluster may be transmitted to identify the state of the EMS of the second cluster 710-2. According to an embodiment of the disclosure, the message for identifying the EMS of the cluster may be transmitted to identify whether the EMS of the second cluster 710-2 is in a standby state. The first HA pod 1010 may identify whether the EMS of the second cluster 710-2 is in a standby state so as to prepare for a case where an abnormal state arises in the first EMS. When an abnormal state arises in the first EMS, the first HA pod 1010 may transmit a state change request message to the second HA pod 1020.

According to an embodiment of the disclosure, after stage S1005, the first HA pod 1010 may fail to receive a response message from the second HA pod 1020. If the first HA pod 1010 fails to receive a response message, the first HA pod 1010 may maintain an active state. In addition, even when failure has occurred in the first EMS operating in the first cluster 710-1, the first HA pod 1010 does not transmit a message indicating a change of the state to the second HA pod 1020.

In an embodiment, in a case where the second HA pod transmits a message for identifying the EMS of a cluster:

According to an embodiment of the disclosure, the second HA pod 1020 may transmit a message for identifying the EMS of the cluster to the first HA pod 1010 (stage S1011). The second HA pod 1020 may transmit the message for identifying the EMS of the cluster at a configured time interval. The message for identifying the EMS of the cluster may be transmitted to determine the state of the first EMS of the first cluster 710-1. According to an embodiment of the disclosure, the message for identifying the EMS of the cluster may be transmitted to identify whether the EMS of the first cluster 710-1 is in an active state. The second HA pod 1020 may identify whether the EMS of the first cluster 710-1 is in an active state so as to prepare for a case where an abnormal state arises in the first EMS. When an abnormal state arises in the first EMS, the second HA pod 1010 may change the state of the EMS of the second cluster from a standby state to an active state.

According to an embodiment of the disclosure, after stage S1011, the second HA pod 1020 may fail to receive a response message from the first HA pod 1010. The reason for failure to receive a response message from the first HA pod 1010 may be that the first EMS is in an abnormal state. If the second HA pod 1020 fails to receive a response message from the first HA pod 1010, the second HA pod 1020 may change the state of the second EMS of the second cluster 710-2. The second HA pod 1020 may change the state of the second EMS of the second cluster 710-2 from a standby state to an active state. This is to maintain the EMS of one cluster to be in a standby state when the EMS of another cluster is in an active state. If the second HA pod 1020 fails to receive a response message from the first HA pod 1010, the second HA pod may determine that the first EMS of the first cluster 710-1 is in a standby state. According to an embodiment of the disclosure, if the second HA pod 1020 determines that the first EMS of the first cluster 710-1 is in a standby state, the second HA pod 1020 may change the state of the second EMS of the second cluster 710-2 from a standby state to an active state in order to maintain an active-standby state (stage S1012).

According to an embodiment of the disclosure, the second HA pod 1020 may transmit a message for identifying the EMS of the cluster to the first HA pod 1010 (stage S1013). The second HA pod 1020 may transmit the message for identifying the EMS of the cluster at a configured time interval. The message for identifying the EMS of the cluster may be transmitted to determine the state of the first EMS of the first cluster 710-1. According to an embodiment of the disclosure, the message for identifying the EMS of the cluster may be transmitted to identify whether the EMS of the first cluster 710-1 is in an active state. The second HA pod 1020 may identify whether the EMS of the first cluster 710-1 is in an active state so as to prepare for a case where an abnormal state arises in the first EMS. When an abnormal state arises in the first EMS, the second HA pod 1010 may change the state of the EMS of the second cluster from a standby state to an active state.

According to an embodiment of the disclosure, the second HA pod 1020 may receive a response message for the message for identifying the cluster from the first HA pod 1010 (stage S1015). The second HA pod 1020 may identify the state of the first EMS of the first cluster, based on the response message. When the first EMS of the first cluster is identified as being in an active state, the second EMS of the second cluster may remain in a standby state.

Figure 11:
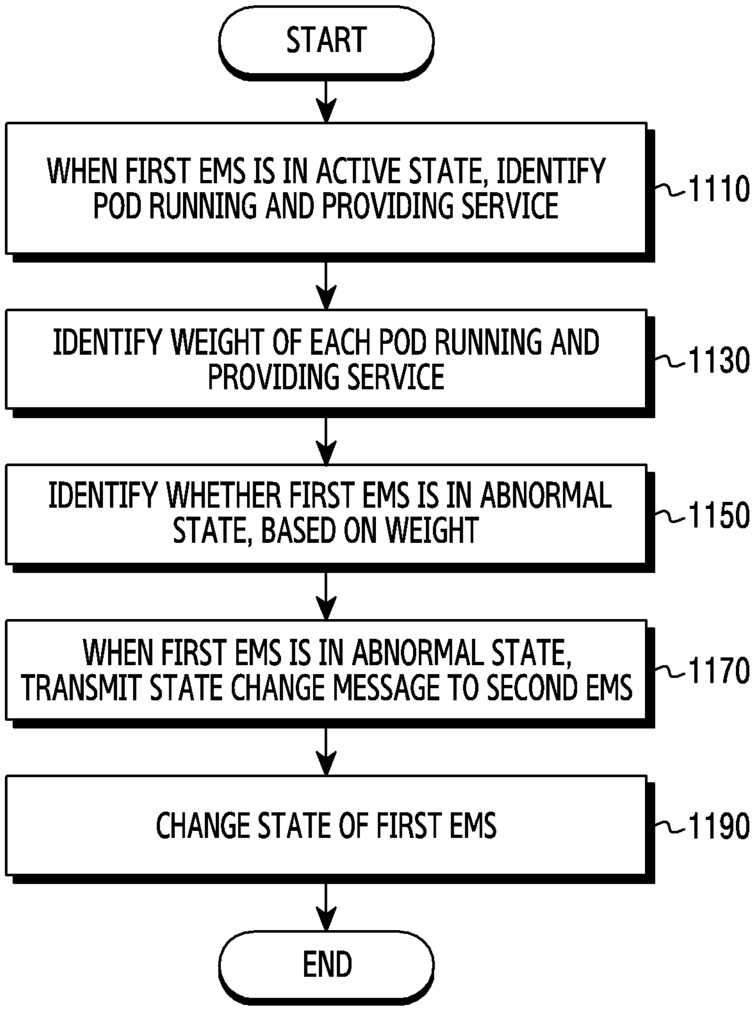
FIG. 11 is a flowchart illustrating a case where a container-based cluster changes the state thereof when an abnormal state of the cluster arises due to an abnormal situation of a pod according to various embodiments.

With reference to FIG. 10 and a relevant description, a procedure of changing a state of a cluster itself when an abnormal state of another cluster arises has been described. FIG. 11 illustrates a procedure of changing a state of a cluster when an abnormal state of the cluster arises due to an abnormal situation of a pod.

FIG. 11 is a flowchart illustrating an example case where a container-based cluster changes the state thereof when an abnormal state of the cluster arises due to an abnormal situation of a pod according to various embodiments.

According to an embodiment of the disclosure, if an application included in a container-based cluster is a state-dependent (stateful) application, when a cluster is in an active state, another cluster may need to maintain a standby state.

According to an embodiment of the disclosure, the description of a cluster may be used to refer to the description of an EMS included in the cluster. In addition, the state of a cluster may be used in the same sense as the state of an EMS included in the cluster. For example, the state of the first cluster 710-1 may be used in the same sense as the state of a first EMS included in the first cluster. For example, the state of the second cluster 710-2 may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

Referring to FIG. 11, in stage 1110, when the first EMS is in an active state, the first EMS may identify a pod that is running and providing service. The active state may include a state where one or more service pods included in an EMS are running and providing service. The pod that is running and providing service may include a service pod that is running and providing service and a synchronization pod that is running and providing service. The synchronization pod may include a high availability (HA) pod, a database pod, and a file replication pod. The HA pod is a high availability pod and may indicate a pod that determines the state of the EMS of the cluster. The database pod may be a pod for database synchronization. The file replication pod may be a pod for file synchronization. A subject that identifies one or more pods may be a first HA pod included in the first EMS.

In stage 1130, a weight of each of the pods that are running and providing service may be identified. In [Equation 1], S(X) indicates a health value of all the pods in cluster X, $Ss_i$ indicates whether the i-th pod is in an active state or an abnormal state, and $Sw_i$ may indicate a weight of the i-th pod. $Ss_i$ is equal to 1 if the i-th pod is in an active state, and is equal to 0 if same is in an abnormal state. In addition, the sum of weights of all the pods may be 1 ([Equation 2]). A user of an EMS service application may configure the weight $Sw_i$ for pod i, and configure a threshold value between 0 and 1. In addition, the weight $Sw_i$ and the threshold value may be configured in advance. Identifying of an abnormal state for each of the pods may be performed by an EMS process, database identification, and server application identification. A subject that identifies whether the i-th pod is in an active state or an abnormal state may be the first HA pod included in the first EMS.

In stage 1150, the first EMS may be identified as being in an abnormal state, based on a weight. The abnormal state may be caused by an abnormal situation. An abnormal situation of the EMS may be, specifically, an abnormal situation of a pod or an abnormal situation of an infra. The abnormal situation of the infra may include a worker node crash, a cluster-level crash, a storage crash, or abnormality of an independent service or network. The weight may be the sum of the weights of pods that are running and providing service, for the i-th pod $Ss_i$. The abnormal state may be identified by a threshold value. If the sum of weights is smaller than the threshold value, the first EMS may be identified as being in an abnormal state. A subject that identifies whether the first EMS is in an abnormal state may be the first HA pod included in the first EMS.

In stage 1170, when the first EMS is in an abnormal state, a state change message may be transmitted to the second EMS. After receiving the state change message from the first EMS, the second EMS may change the state of the second EMS from a standby state to an active state. The standby state may include a state where one or more service pods included in an EMS are running but providing service. This is to, even when an abnormal state arises in the first EMS, enable a user of an EMS service application to continuously use the EMS service application through the second EMS. According to an embodiment of the disclosure, before transmitting the state change message, the first EMS may transmit a state change request message first. Thereafter, the first EMS may receive a response message to the state change request message from the second EMS. Thereafter, the first EMS may transmit a state change message, based on the response message received from the second EMS. A subject that transmits the state change message transmitted by the first EMS may be the first HA pod included in the first EMS. A subject that receives the state change message received by the second EMS may be a second HA pod included in the second EMS.

In stage 1190, the first EMS may change the state. When the state of the first EMS is an abnormal state, the state of the first EMS needs to be changed to a standby state. This is because, in a state-dependent application environment, when one EMS is in an active state, another EMS is required to be in a standby state. A subject that indicates a state change in the first EMS may be the first HA pod included in the first EMS.

Figure 12:
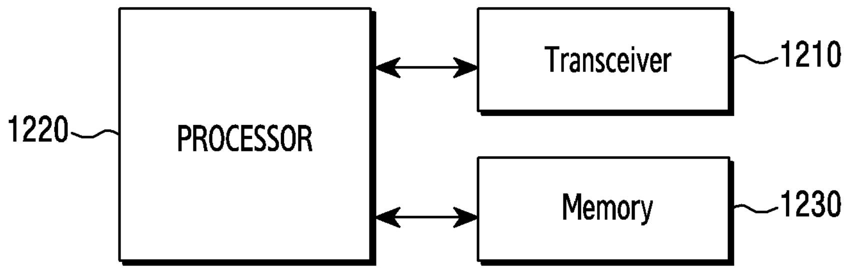
FIG. 12 is a block diagram illustrating an example configuration of a container-based cluster environment according to various embodiments.

FIG. 12 is a block diagram illustrating an example configuration of a container-based cluster environment according to various embodiments. A configuration illustrated as an example in FIG. 12 may be understood as a configuration of a device having a function of at least one of a first cluster, a first network, a second cluster, and a second network. The first cluster and the second cluster may correspond to container-based clusters.

According to an embodiment of the disclosure, the description of a cluster may be used to refer to the description of an EMS included in the cluster. In addition, the state of a cluster may be used in the same sense as the state of an EMS included in the cluster. For example, the state of the first cluster may be used in the same sense as the state of a first EMS included in the first cluster. For example, the state of the second cluster may be used in the same sense as the state of a second EMS included in the second cluster. For example, the state of a candidate cluster may be used in the same sense as the state of a candidate EMS included in the candidate cluster. According to an embodiment of the disclosure, the description of an application may be used to refer to the description of an EMS service application.

Referring to FIG. 12, a cluster or a network may include a transceiver 1210, a memory 1230, and a processor (e.g., including processing circuitry) 1220.

The transceiver 1210 provides an interface for performing communication with other devices. For example, the transceiver 1210 converts, into a physical signal, a bitstream transmitted from an entity of the cluster or network to another cluster or network entity or another device, and converts a physical signal received from another device into a bitstream. For example, the transceiver 1210 may transmit and receive a signal. Specifically, the transceiver 1210 may be called a modem, a transmitter, a receiver, or a transceiver accordingly.

The memory 1230 stores data such as a basic program, an application program, and configuration information for an operation of an entity of the cluster or network. According to an embodiment of the disclosure, the memory 1230 stores data such as a basic program, an application program, and configuration information for an operation of the cluster or network. The memory 1230 may be configured as a volatile memory, a nonvolatile memory, or a combination of a volatile memory and a nonvolatile memory. In addition, the memory 1230 provides stored data according to a request of the processor 1220.

The processor 1220 may include various processing circuitry and controls overall operations of an entity of the cluster or network. According to an embodiment of the disclosure, the processor 1220 transmits and/or receives a signal through the transceiver 1210. In addition, the processor 1220 may record and read data in and from the memory 1230. To this end, the processor 1220 may include at least one processor. For example, the processor 1220 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. According to various embodiments of the disclosure, the processor 1220 may perform control such that synchronization using a wireless communication network is performed. For example, the processor 1220 may control overall operations of an entity of the cluster or network described above.

A method performed by a first element management system (EMS) of a first cluster according to various example embodiments of the disclosure as described above may include, in case that the first EMS is in an active state, identifying pods that are running and providing service, identifying respective weights of the pods that are running and providing service, identifying that a state of the first EMS is an abnormal state requiring a state change, based on the respective weights of the pods that are running and providing service, in case that the state of the first EMS is the abnormal state, transmitting, to a second EMS of a second cluster, a state change message indicating a change of a state of the second EMS from a standby state to the active state, and changing the state of the first EMS to the standby state, wherein the active state includes a state where one or more service pods included in an EMS are running and providing service, and wherein the standby state includes a state where the one or more service pods are running but not providing service.

In an example embodiment, the identifying of that the state of the first EMS is the abnormal state may include summing the respective weights of the pods that are running and providing service, identifying whether a sum of the weights exceeds a threshold value, and in case that the sum of the weights does not exceed the threshold value, identifying that the state of the first EMS is the abnormal state.

In an example embodiment, the identifying of that the state of the first EMS is the abnormal state in case that the sum of the weights does not exceed the threshold value may include in case that the sum of the weights does not exceed the threshold value, repeating a predetermined number of times the summing of the respective weights of the pods that are running and providing service, and in case that the sum of the weights does not exceed the threshold value even after repeating the predetermined number of times, identifying that the state of the first EMS is the abnormal state.

In an example embodiment, the weights, the threshold value, and the predetermined number of times may be determined in advance or determined by a user of the first EMS.

In an example embodiment, the sum of the weights and the threshold value may not exceed 1.

In an example embodiment, the first EMS may further include a synchronization pod, and the synchronization pod may be a pod that is running and providing service regardless of the active state or the standby state.

In an example embodiment, the synchronization pod may include a high availability (HA) pod configured to identify a state of an EMS, a database pod configured to synchronize data related to an application being executed by the EMS, and a file replication pod configured to synchronize data stored in a cluster.

In an example embodiment, the transmitting of the state change message in case that the state of the first EMS is the abnormal state may include transmitting, to the second EMS, a state change preparation message indicating preparation for a state change from the standby state to the active state, and receiving a response message indicating that a state change is possible from the second EMS, based on the state change preparation message.

In an example embodiment, the changing of the state of the first EMS to the standby state may include receiving, from the second EMS, a response message indicating that the state of the second EMS has been changed from the standby state to the active state, based on the state change message.

A method performed by a second element management system (EMS) of a second cluster according to various example embodiments of the disclosure as described above may include, in case that the second EMS is in a standby state and a first EMS of a first cluster is in an abnormal state requiring a state change, receiving a state change message from the first EMS, and changing a state of the second EMS from the standby state to an active state, wherein the active state includes a state where one or more service pods included in an EMS are running and providing service, wherein the standby state includes a state where the one or more service pods are running but not providing service, and wherein the abnormal state is identified based on a weight of a pod that is running and providing service.

A first element management system (EMS) of a first cluster according to various example embodiments of the disclosure as described above may include a transceiver and at least one processor, comprising processing circuitry, connected to the transceiver, wherein at least one processor, individually and/or collectively, is configured to, in case that the first EMS is in an active state, identify pods that are running and providing service, identify respective weights of the pods that are running and providing service, identify that a state of the first EMS is an abnormal state requiring a state change, based on the respective weights of the pods that are running and providing service, in case that the state of the first EMS is the abnormal state, transmit, to a second EMS of a second cluster, a state change message indicating a change of a state of the second EMS from a standby state to the active state, and change the state of the first EMS to the standby state, wherein the active state includes a state where one or more service pods included in an EMS are running and providing service, and wherein the standby state includes a state where the one or more service pods are running but not providing service.

A second element management system (EMS) of a second cluster according to various example embodiments of the disclosure as described above may include a transceiver and at least one processor, comprising processing circuitry, connected to the transceiver, wherein at least one processor, individually and/or collectively, is configured to, in case that the second EMS is in a standby state and a first EMS of a first cluster is in an abnormal state requiring a state change, receive a state change message from the first EMS, and change a state of the second EMS from the standby state to an active state, wherein the active state includes a state where one or more service pods included in an EMS are running and providing service, wherein the standby state includes a state where the one or more service pods are running but not providing service, and wherein the abnormal state is identified based on a weight of a pod that is running and providing service.

The electronic device according to various embodiments set forth herein may be one of various types of electronic devices. The electronic device may include, for example, a portable communication device (e.g., a smart phone), a computer device, a portable multimedia device, a portable medical device, a camera, a wearable device, a home appliance, or the like. The electronic device according to embodiments of the disclosure is not limited to those described above.

It should be appreciated that various example embodiments and the terms used therein are not intended to limit the technological features set forth herein to particular embodiments and the disclosure includes various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C” may include all possible combinations of the items enumerated together in a corresponding one of the phrases. Such terms as “a first,” “a second,” “the first,” and “the second” may be used to simply distinguish a corresponding element from another, and does not limit the elements in other aspect (e.g., importance or order). If an element (e.g., a first element) is referred to, with or without the term “operatively” or “communicatively”, as “coupled with/to” or “connected with/to” another element (e.g., a second element), the element may be coupled/connected with/to the other element directly (e.g., wiredly), wirelessly, or via a third element.

As used herein, the term “module” may include a unit implemented in hardware, software, or firmware, or any combination thereof, and may interchangeably be used with other terms, for example, “logic”, “logic block”, “part”, or “circuitry”. The “module” may be a single integrated component, or a minimum unit or part thereof, adapted to perform one or more functions. For example, according to an embodiment, the “module” may be implemented in the form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., an electronic device). For example, a processor of the machine (e.g., an electronic device) may invoke at least one of the one or more instructions stored in the storage medium, and execute it. This allows the machine to be operated to perform at least one function according to the at least one instruction invoked. The one or more instructions each may include a code generated by a compiler or a code executable by an interpreter. The machine-readable storage medium may be provided in the form of a non-transitory storage medium. Herein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store M), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements or operations may be omitted, or one or more other elements or operations may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various modifications, alternatives and/or variations of the various example embodiments may be made without departing from the true technical spirit and full technical scope of the disclosure, including the appended claims and their equivalents. It will also be understood that any of the embodiment(s) described herein may be used in conjunction with any other embodiment(s) described herein.

What is claimed is:

1. A method performed by a first element management system (EMS) of a first cluster, the method comprising:

based on the first EMS being in an active state, identifying pods running and providing service;

identifying weights of each of the pods running and providing service;

identifying that a state of the first EMS is an abnormal state requiring a state change, based on the weights of the each of the pods running and providing service;

based on the state of the first EMS being the abnormal state, transmitting, to a second EMS of a second cluster, a state change message indicating to change a state of the second EMS from a standby state to an active state; and changing the state of the first EMS to the standby state, wherein the active state comprises a state where one or more service pods included in an EMS are running and providing service, and wherein the standby state comprises a state where the one or more service pods are running but not providing service.

2. The method of claim 1, wherein the identifying that the state of the first EMS is the abnormal state comprises:

summing the weights of the each of the pods running and providing service;

identifying whether a sum of the weights exceeds a threshold value; and based on the sum of the weights not exceeding the threshold value, identifying that the state of the first EMS is the abnormal state.

3. The method of claim 2, wherein the identifying that the state of the first EMS is the abnormal state based on the sum of the weights not exceeding the threshold value comprises:

based on the sum of the weights not exceeding the threshold value, repeating a specified number of times the summing of the weights of the each of the pods running and providing service; and based on the sum of the weights after repeating the specified number of times the summing of the weights not exceeding the threshold value, identifying that the state of the first EMS is the abnormal state.

4. The method of claim 3, wherein the weights, the threshold value, and the specified number of times are specified or determined by a user of the first EMS.

5. The method of claim 2, wherein the sum of the weights and the threshold value do not exceed 1.

6. The method of claim 1, wherein the first EMS further comprises a synchronization pod, and wherein the synchronization pod comprises a pod running and providing service regardless of the active state or the standby state.

7. The method of claim 6, wherein the synchronization pod comprises:

a high availability (HA) pod configured to identify a state of an EMS;

a database pod configured to synchronize data related to an application being executed by the EMS; and a file replication pod configured to synchronize data stored in a cluster.

8. The method of claim 1, further comprising, in order to transmit the state change message based on the state of the first EMS being the abnormal state:

transmitting, to the second EMS, a state change preparation message indicating to prepare for a state change from the standby state to the active state; and receiving, from the second EMS, a response message indicating that a state change is possible, based on the state change preparation message.

9. The method of claim 1, further comprising, in order to change the state of the first EMS to the standby state, receiving, from the second EMS, a response message indicating that the state of the second EMS has been changed from the standby state to the active state, based on the state change message.

10. A method performed by a second element management system (EMS) of a second cluster, the method comprising:
based on the second EMS being in a standby state and a first EMS of a first cluster being in an abnormal state requiring a state change, receiving a state change message from the first EMS; and
changing a state of the second EMS from the standby state to an active state,
wherein the active state comprises a state where one or more service pods included in an EMS are running and providing service,
wherein the standby state comprises a state where the one or more service pods are running but not providing service, and
wherein the abnormal state is identified based on weights of pods running and providing service.

11. A first element management system (EMS) of a first cluster, the first EMS comprising:
a transceiver;
a processor, comprising processing circuitry; and
memory storing instructions that, when executed by the processor, cause the first EMS to:
based on the first EMS being in an active state, identify pods running and providing service;
identify weights of each of the pods running and providing service;
identify that a state of the first EMS is an abnormal state requiring a state change, based on the weights of the each of the pods running and providing service;
based on the state of the first EMS being the abnormal state, transmit, to a second EMS of a second cluster, a state change message indicating to change a state of the second EMS from a standby state to the active state; and
change the state of the first EMS to the standby state,
wherein the active state comprises a state where one or more service pods included in an EMS are running and providing service, and
wherein the standby state comprises a state where the one or more service pods are running but not providing service.

12. The first EMS of claim 11, wherein the instruction, when executed by the processor, cause the first EMS to, in order to identify that the state of the first EMS is the abnormal state:
sum the weights of the each of the pods running and providing service;
identify whether a sum of the weights exceeds a threshold value; and
based on the sum of the weights not exceeding the threshold value, identify that the state of the first EMS is the abnormal state.

13. The first EMS of claim 12, wherein the instruction, when executed by the processor, cause the first EMS to, in order to identify that the state of the first EMS is the abnormal state in case that the sum of the weights does not exceed the threshold value:
based on the sum of the weights not exceeding the threshold value, repeat a specified number of times the summing of the weights of the each of the pods running and providing service; and
based on the sum of the weights after repeating the specified number of times the summing of the weights not exceeding the threshold value, identify that the state of the first EMS is the abnormal state.

14. The first EMS of claim 13, wherein the weights, the threshold value, and the specified number of times are specified or determined by a user of the first EMS.

15. The first EMS of claim 12, wherein the sum of the weights and the threshold value do not exceed 1.

16. The first EMS of claim 11, wherein the first EMS further comprises a synchronization pod, and
wherein the synchronization pod includes a pod running and providing service regardless of the active state or the standby state.

17. The first EMS of claim 16, wherein the synchronization pod comprises:
a high availability (HA) pod configured to identify a state of an EMS;
a database pod configured to synchronize data related to an application being executed by the EMS; and
a file replication pod configured to synchronize data stored in a cluster.

18. The first EMS of claim 11, wherein the instruction, when executed by the processor, cause the first EMS to, in order to transmit the state change message based on the state of the first EMS being the abnormal state:
transmit, to the second EMS, a state change preparation message indicating to prepare for a state change from the standby state to the active state; and
receive, from the second EMS, a response message indicating that a state change is possible, based on the state change preparation message.

19. The first EMS of claim 11, wherein the instruction, when executed by the processor, cause the first EMS to, in order to change the state of the first EMS to the standby state, receive, from the second EMS, a response message indicating that the state of the second EMS has been changed from the standby state to the active state, based on the state change message.

20. A second element management system (EMS) of a second cluster, the second EMS comprising:
a transceiver;
a processor, comprising processing circuitry; and
memory storing instructions that, when executed by the processor, cause the second EMS to:
based on the second EMS being in a standby state and a first EMS of a first cluster being in an abnormal state requiring a state change, receive a state change message from the first EMS; and
change a state of the second EMS from the standby state to an active state,
wherein the active state comprises a state where one or more service pods included in an EMS are running and providing service,
wherein the standby state comprises a state where the one or more service pods are running but not providing service, and
wherein the abnormal state is identified based on weights of pods running and providing service.

* * * * *